US009781585B2

(12) United States Patent
Sheng

(10) Patent No.: US 9,781,585 B2
(45) Date of Patent: Oct. 3, 2017

(54) LATENCY REDUCTION FOR MODE SWITCHING IN SIDELINK COMMUNICATIONS

(71) Applicant: Sharp Laboratories of America, Inc., Camas, WA (US)

(72) Inventor: Jia Sheng, Vancouver, WA (US)

(73) Assignee: SHARP Laboratories of America, Inc., Camas, WA (US)

( * ) Notice: Subject to any disclaimer, the term of this patent is extended or adjusted under 35 U.S.C. 154(b) by 98 days.

(21) Appl. No.: 14/859,648

(22) Filed: Sep. 21, 2015

(65) Prior Publication Data

US 2016/0094975 A1 Mar. 31, 2016

Related U.S. Application Data

(60) Provisional application No. 62/055,033, filed on Sep. 25, 2014.

(51) Int. Cl.
| | |
|---|---|
| *H04W 76/02* | (2009.01) |
| *H04W 8/00* | (2009.01) |
| *H04L 12/24* | (2006.01) |
| *H04W 72/04* | (2009.01) |
| *H04W 74/08* | (2009.01) |

(52) U.S. Cl.
CPC ......... *H04W 8/005* (2013.01); *H04L 41/0654* (2013.01); *H04W 72/042* (2013.01); *H04W 74/0833* (2013.01)

(58) Field of Classification Search
None
See application file for complete search history.

(56) References Cited

U.S. PATENT DOCUMENTS

| 2009/0201873 A1 | 8/2009 | Korhonen et al. |
| 2012/0184306 A1 | 7/2012 | Zou et al. |

(Continued)

OTHER PUBLICATIONS

International Search Report and Written Opinion dated Dec. 18, 2015 in PCT Application No. PCT/US2015/051170.

(Continued)

*Primary Examiner* — Fan Ng
(74) *Attorney, Agent, or Firm* — Nixon & Vanderhye P.C.

(57) ABSTRACT

A wireless terminal (26) is capable of wireless communications with a node (22) of a radio access network over a radio interface. A method in the wireless terminal (26) comprises providing both a first set of radio resources (56) and a second set of radio resources (58). The first set of radio resources (56) is which may be used by the wireless terminal when performing a device-to-device (D2D/SL) communication with another wireless terminal when the wireless terminal is within coverage of a radio access network. The second set of radio resources (58) is which may be used by the wireless terminal when performing a device-to-device (D2D/SL) communication with the other wireless terminal when the wireless terminal is not within coverage of the radio access network. The method further comprises allowing the wireless terminal (26), when still within coverage of the radio access network, to use the second set of resources (58) for the device-to-device (D2D/SL) communication in conjunction with a random access procedure.

12 Claims, 8 Drawing Sheets

(56) References Cited

U.S. PATENT DOCUMENTS

| | | | |
|---|---|---|---|
| 2012/0281679 A1* | 11/2012 | Fan | H04W 74/008 370/336 |
| 2013/0148566 A1 | 6/2013 | Doppler et al. | |
| 2014/0105175 A1 | 4/2014 | Dinan | |
| 2014/0123037 A1* | 5/2014 | Lee | G06F 3/0484 715/760 |
| 2014/0242963 A1 | 8/2014 | Novlan et al. | |
| 2015/0036573 A1* | 2/2015 | Malik | H04W 52/0254 370/311 |
| 2016/0021649 A1* | 1/2016 | Zisimopoulos | H04W 72/0406 370/329 |
| 2016/0150391 A1* | 5/2016 | Lee | H04W 56/002 370/329 |
| 2016/0165411 A1* | 6/2016 | Lee | H04W 4/08 455/426.1 |
| 2016/0183219 A1* | 6/2016 | Kim | H04W 72/0406 370/329 |
| 2016/0242144 A1* | 8/2016 | Adachi | H04W 72/04 |
| 2017/0034686 A1* | 2/2017 | Zhang | H04L 12/6418 |

OTHER PUBLICATIONS

3GPP TS 36.213 V12.0.0; $3^{rd}$ Generation Partnership Project; Technical Specification Group Radio Access Network; Evolved Universal Terrestrial Radio Access (E-UTRA); Physical layer procedures (Release 12) (Dec. 2013).

3GPP TS 36.321 V12.2.1; $3^{rd}$ Generation Partnership Project; Technical Specification Group Radio Access Network; Evolved Universal Terrestrial Radio Access (E-UTRA); Medium Access Control (MAC) Protocol Specification (Release 12) (Jun. 2014).

3GPP TS 36.133 V12.2.0; $3^{rd}$ Generation Partnership Project; Technical Specification Group Radio Access Network; Evolved Universal Terrestrial Radio Access (E-UTRA); Requirements for Support of Radio Resource Management (Release 12) (Dec. 2013).

3GPP TS 36.331 V12.2.0; $3^{rd}$ Generation Partnership Project; Technical Specification Group Radio Access Network; Evolved Universal Terrestrial Radio Access (E-UTRA); Radio Resource Control (RRC); Protocol Specification (Release 12) (Jun. 2014).

R1-143259, 3GPP TSG-RAN WG1 #78, U.S. Dept. of Commerce, "Public Safety Concerns and Proposals on D2D Resource Allocation", Dresden, Germany, Aug. 18-22, 2014.

3GPP TSG RAN WG2 #87, RAN2 Chairman (Ericsson) Chairman Notes, Dresden, Germany, Aug. 18-22, 2014.

3GPP TR 36.843 V12.0.1; $3^{rd}$ Generation Partnership Project; Technical Specification Group Radio Access Network; Study on LTE Device to Device Proximity Services; Radio Aspects (Release 12) (Mar. 2014).

3GPP TSG RAN WG2 #85bis, RAN2 Chairman (Ericsson), Chairman Notes, Valencia, Spain, Mar. 31, 2014-Apr. 4, 2014.

3GPP TSG RAN WG2 #86, RAN2 Chairman (Ericsson), Chairman Notes, Seoul, South Korea, May 19-23, 2014.

* cited by examiner

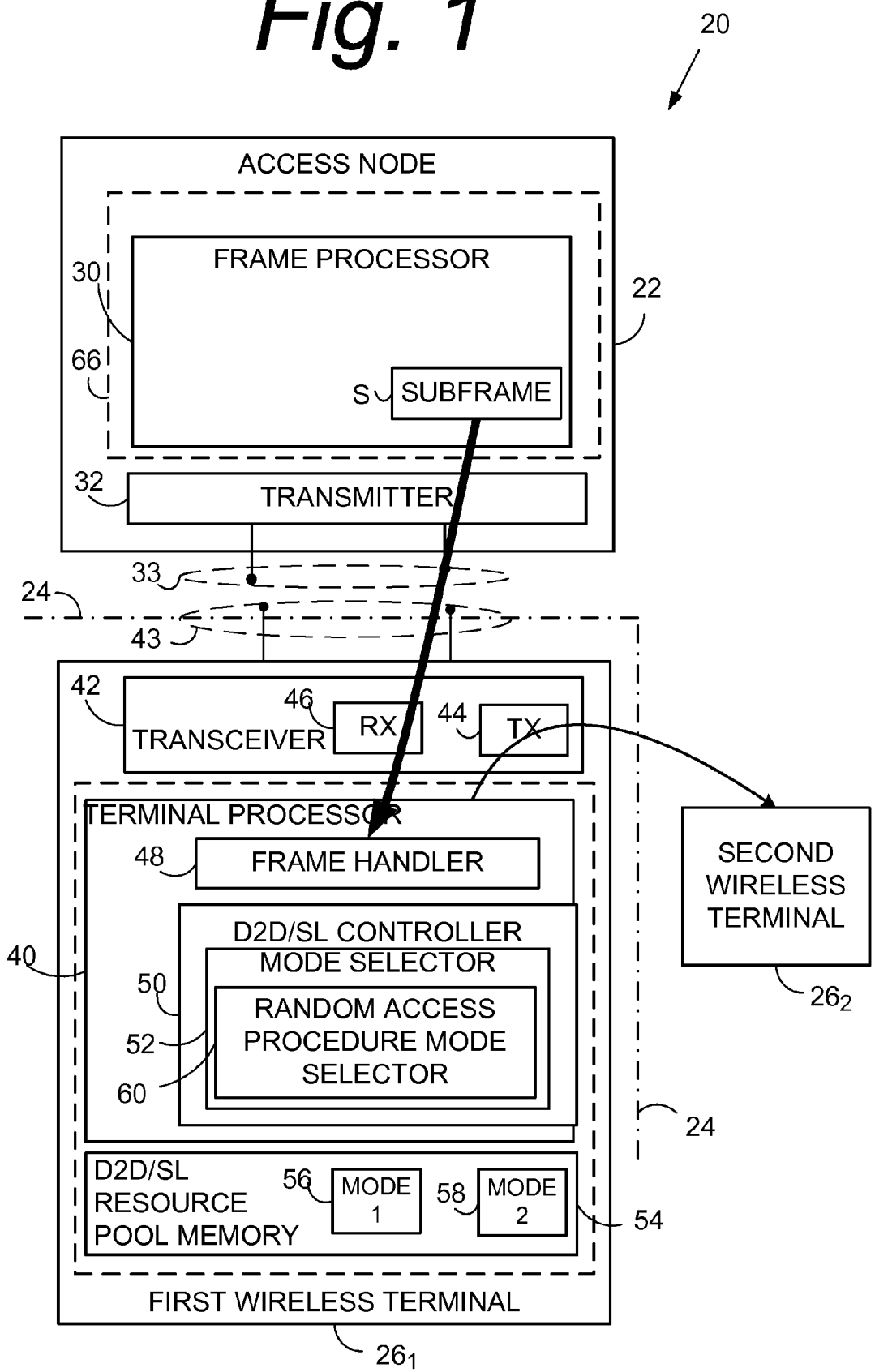

LATENCY REDUCTION FOR MODE SWITCHING IN SIDELINK COMMUNICATIONS

This application claims the priority and benefit of U.S. Provisional Patent Application 62/055,033, filed Sep. 25, 2014, entitled "LATENCY REDUCTION FOR MODE SWITCHING IN DEVICE-TO-DEVICE COMMUNICATIONS", which is incorporated herein by reference in its entirety.

TECHNICAL FIELD

The technology relates to wireless communications, and particularly to allocating or granting radio resources for wireless device-to-device (D2D) or sidelink direct (SL) communications.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station. In general, communications between a network node such as a base station and a wireless terminal is known as "WAN" or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals" or "communications") from one user equipment terminal to one or more other user equipment terminals may not be communicated through a base station or other network control device of a telecommunication system.

D2D communication can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which D2D communication may be used.

From the perspective of a wireless terminal (also called a "user equipment" or "UE", the wireless terminal may operate in either of two modes for resource allocation. In a first mode (Mode 1), a radio access network, e.g., a node of a radio access network such as an eNodeB (eNB) or 3GPP Release-10 relay node, schedules the exact resources to be used by the wireless terminal to transmit direct data and direct control information when engaging in D2D communications. In a second mode (Mode 2), the wireless terminal on its own selects resources from resource pools to transmit direct data and direct control information when engaging in D2D communications.

Citation List of Non Patent Literature ("NPL")

NPL 1: 3GPP TS 36.213 V12.0.0.
NPL 2: 3GPP TS 36.321 V12.2.1.
NPL 3: 3GPP TS 36.133 V12.2.1.
NPL 4: 3GPP TS 36.331 V12.2.0.
NPL 5: 3GPP R1-142359.
NPL 6: 3GPP RAN2#85bis Chairman's notes.
NPL 7: 3GPP RAN2#86 Chairman's notes.
NPL 8: 3GPP RAN2#87 Chairman's notes.

What is needed are methods, apparatus, and/or techniques for mitigating latency when a wireless terminal switches from Mode 1 to Mode 2 in conjunction with a random access procedure.

SUMMARY

The latency reduction method and apparatus of the technology disclosed herein allows a wireless terminal to use Mode 2 resources in the early stage of detecting exceptional cases, which may require quite some time for final declaration

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 1 is a schematic view of an example generic embodiment of a radio communications network in which a wireless terminal participates in device-to-device (D2D) communications with capability, while still being in-coverage, of selecting Mode 2 resources in conjunction with a random access procedure.

DETAILED DESCRIPTION

Figure 2A:
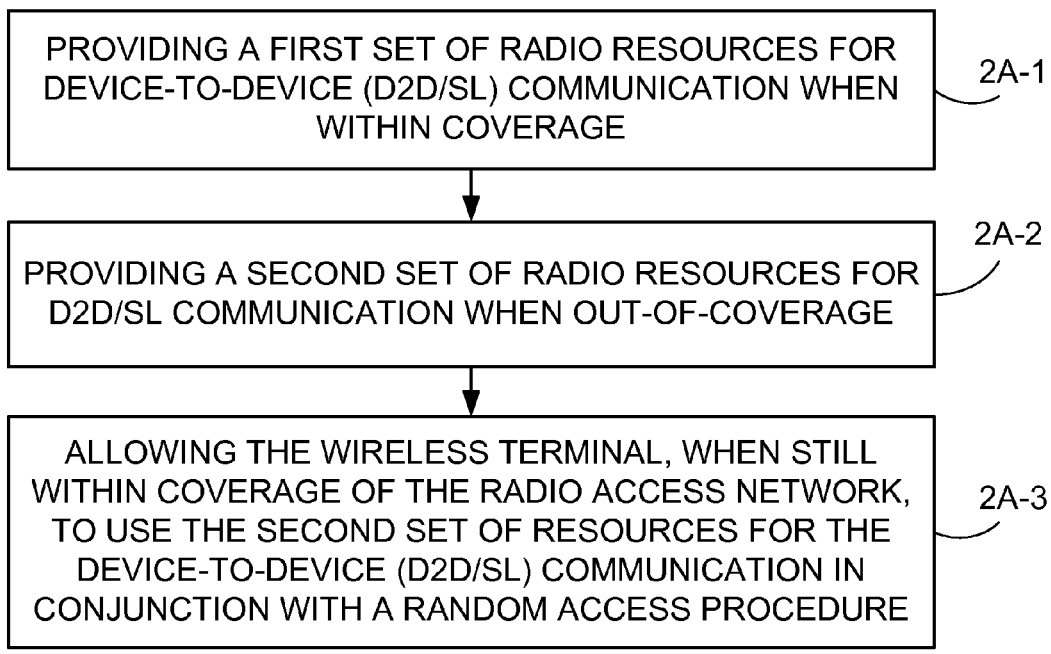
FIG. 2A is a flowchart depicting basic, example acts or steps involved in generic method of operating a wireless terminal which may select Mode 2 resources in conjunction with a random access procedure.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" may refer to a mode of communication between or among wireless terminals that operate on a cellular network or other telecommunications system in which the communication data traffic from one wireless terminal to another wireless terminal does not pass through a centralized base station or other device in the cellular network or other telecommunications system. The "device-to-device (D2D) communication" encompasses one or both of D2D signaling (e.g., D2D control information) and D2D data. "Device-to-device ("D2D") communication may also be known as "sidelink direct" communication (e.g., sidelink communication). The term "sidelink direct" may also be shortened to "sidelink", abbreviated as "SL", and as such "sidelink" may be used herein to refer to sidelink direct. Yet further, the term "ProSe" (Proximity Services) direct communication may be used in lieu of sidelink direct communication or device-to-device (D2D) communication. Therefore, it is to be understood that herein the terms "sidelink direct", 'sidelink" (SL), "ProSe" and "device-to-device (D2D)" may be interchangeable and synonymous.

Thus, as mentioned above, device-to-device (D2D) or sidelink direct communication differs from "WAN" or "Cellular communication" which is or involves communication between the base station and the wireless terminal. In device-to-device (D2D) communication, communication data is sent using communication signals and can include voice communications or data communications intended for consumption by a user of a wireless terminal. Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

Device-to-device (D2D) communication, e.g., sidelink direct communication, may be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for present and future generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which SL communication may be used. An aspect of the 3GPP work pertains to functionality to allow sidelink direct communication to enable Proximity Services (ProSe) for public safety and, certain non-public safety requirements (See, e.g., RP-122009).

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As mentioned above, in the currently prescribed D2D communication scheme a wireless terminal within network coverage uses resources for D2D discovery and communication assigned by the controlling node, in accordance with Mode 1. However, if the wireless terminal is out of network coverage, it may use pre-assigned resources for communications, in accordance with Mode 2.

In terms of Mode 2, D2D services include ProSe Direct Communication and ProSe Direct Discovery. ProSe Direct Communication is a mode of communication whereby two wireless terminals can communicate with each other directly over the PC5 interface (i.e., direct interface between two wireless terminals). This communication mode is supported when the wireless terminal is served by E-UTRAN and when the wireless terminal is outside of E-UTRA coverage. A transmitter wireless terminal transmits a Scheduling assignment (SA) to indicate the resources it is going to use for data transmission to the receiver wireless terminals. ProSe Direct Discovery is defined as the procedure used by the ProSe-enabled wireless terminal to discover other ProSe-enabled wireless terminal(s) in its proximity using E-UTRA direct radio signals via the PC5 interface.

Generally, the network coverage detection should be based on the downlink received power. The downlink received power is measured with respect to cell-specific reference signal strength. The downlink radio link quality of the primary cell is monitored by the wireless terminal for the purpose of indicating out-of-sync/in-sync status to higher layers. The physical layer in the wireless terminal may, in radio frames where the radio link quality is assessed, indicate out-of-sync to higher layers through a radio link failure (RLF) report when the radio link quality is worse than the threshold Qout. When the radio link quality is better than the threshold Qin, the physical layer in the wireless terminal may, in radio frames where the radio link quality is assessed, indicate in-sync to higher layers.

Radio Link Failure (RLF) related actions include both detection and recovery of physical layer radio problems (e.g., in RRC_Connected) as well as detection or radio link failure. For detection of Detection of physical layer problems in RRC_CONNECTED, the wireless terminal may start timer T310 upon receiving N310 consecutive "out-of-sync" indications for the PCell from lower layers while neither T300, T301, T304 nor T311 is running, start timer T310. In terms of recovery of physical layer problems, the wireless terminal may, upon receiving N311 consecutive "in-sync" indications for the PCell from lower layers while T310 is running, stop timer T310 and stop timer T312 (if timer T312 is running). The wireless terminal may consider a radio link failure to occur upon detection of any of: (1) timer T310 expiry; (2) timer T312 expiry; 3) a random access problem indication from MAC while neither T300, T301, T304 nor T311 is running; or (4) an indication from RLC that the maximum number of retransmissions has been reached. Upon occurrence of a radio link failure so determined, the wireless terminal may store the radio link failure information in an information element VarRLF-Report by setting fields thereof.

If a wireless terminal engaging in D2D communications were to incorrectly determine its situation of in/out of network coverage, e.g., if the wireless terminal were to try to use the pre-assigned resources within network coverage, it may affect the current LTE networks with strong interference and thereby be very dangerous. Therefore, there is impetus for an accurate determination whether the wireless terminal determines is in or out of network coverage.

In the normal operation, when a wireless terminal is in coverage, the wireless terminal may use Mode 1 or Mode 2 for transmission, depending on the configuration of eNB. When the wireless terminal is out of coverage, the wireless terminal only uses Mode 2, as there is no connection between the wireless terminal and the eNB when the wireless terminal is out of coverage. A wireless terminal is determined to be "in coverage" if the wireless terminal is in RRC_CONNECTED state or camps on the cell when the UE is RRC_IDLE state.

On the other hand, rapid fluctuations of wireless channels may introduce "exceptional cases", e.g., Radio Link Failure (RLF), for an in-coverage wireless terminal. In current RAN2, there was an agreement that a wireless terminal considers itself to be in exceptional conditions while either of certain timers associated with a RRC Connection RE-ESTABLISHMENT procedure (T311 timer or T301 timer) is running. Both the T301 timer and the T311 timer are triggered for an RRC Connection RE-ESTABLISHMENT procedure. When such an exceptional case occurs, it has been agreed in RAN2 that a wireless terminal operating in Mode1 is allowed to operate temporarily in Mode2 in order to mitigate unexpected radio link problems.

During normal operation, the wireless terminal (UE) only changes between mode 1 and mode 2 if it is configured by the eNB to do so. If the UE is instructed to use mode 1, there may be exceptional cases where the UE is allowed to use mode 2 temporarily. The UE considers itself to be in exceptional case while T311 or T301 is running and may use mode-2 resources provided by the current cell. In normal operation (UEs in RRC_CONNECTED), the selection of Mode1 and Mode2 is fully configured by the eNB. A UE operating in Mode 1 basically follows existing mechanism of measurement event and measurement report to perform mode switching. When the received power from the UE reaches a configured threshold the UE transitions to Mode 2.

The eNB can then release the Mode 1 resources it allocated to this UE for D2D data and Scheduling Assignment (SA). This scheme is simple and uses existing mechanism to inform eNB to switch between Mode1 and Mode2. From a public safety perspective, the configurable threshold is used to separate the Mode2 operation from Radio Link Failure (RLF) detection when a UE is in coverage, where the network determines when it is most appropriate to use Mode1 or Mode2 resource allocation schemes. Alternatively a UE could autonomously operate in Mode2 only with a threshold configured by eNB to be infinite. That is, there is an overlapping zone created by the threshold between in-coverage and out-of-coverage, so that Mode2 resource allocation may be invoked in the zone while the UE is still in RRC_CONNECTED. In that case, the "handoff" between in-coverage and out-of-coverage can be seamless by invoking Mode2 operation early enough to prevent service disruptions due to RLF. Furthermore, switching from Mode2 to Mode1 can be handled more easily compared to the mode switch from Mode1 to Mode2. A UE will keep on using Mode2 until it is in RRC_CONNECTED and instructed by eNB to switch to Mode1. However, rapid fluctuations of wireless channels could still introduce RLF exceptional cases for a UE operating in Mode1 but not being transitioned to Mode2 early enough before its RRC connection with the eNB is lost. Thus, only in exceptional cases a UE operating in Mode1 is allowed temporarily operating in Mode2 in order to mitigate unexpected radio link problems. However, there was no agreement on the exit condition for a UE in the exceptional case switching back to normal operation. Based on the above, UE is allowed to use Mode2 resources when RRC connection re-establishment procedure is initiated and T311 or T301 starts; yet T311 or T301 would start only after T310 expires. Because the existing RLF criteria are used to indicate the occurrence of exceptional conditions, the radio link interruption actually had happened before the timer T311 starts running. The total duration of disruption depends on the setting of T310 timer and the period of out-of-sync measurement report. The evaluation period of downlink radio link quality is at least 200 ms before sending the number of out-of-sync indications to the higher layers. If the detected number of out-of-sync indications is larger than N310 within 200 ms, UE then launches timer T310. Until T310 expires, UE can keep evaluating the radio link condition. The default setting of T310 is 1000 ms, combined with 200 ms out-of-sync report period; the total interrupt time could up to 1200 ms. That is, 60 voice frames are lost in a 1200 ms outage while the minimum 200 ms out-of-sync detection is equivalent to losing 10 voice frames. From public safety perspective, current RLF based trigger conditions for exceptional cases incur latency issues for Mode1/Mode2 switching that needs to be mitigated. In addition, the total latency for Mode1/Mode2 switching, including measurement reporting, event triggering and mode-switching procedures, also needs to be studied. Multiple configurable thresholds could also be introduce to allow the network semi-statically adapting the mode switch operations to the actual wireless channel conditions for each UE in an incident area. That is, the threshold could be elevated (or de-elevated) based on occurrences (or non-occurrence) of each RLF event when a UE is operating in Mode.

If a UE is in coverage it may use mode 1 if the eNB configures it accordingly. If the UE is instructed to use mode 1, there may be exceptional cases where the UE is allowed to use mode 2 temporarily (e.g. if UE fails to establish an RRC connection . . . ). The exceptional cases rather than an edge-of-coverage "state" is defined. In general, the eNB may configure a UE in RRC_CONNECTED by dedicated signalling with a mode 2 resource allocation transmission resource pool that may be used without constraints while the UE is RRC_CONNECTED. Alternatively, the eNB may configure a UE in RRC_CONNECTED by dedicated signalling with a mode 2 resource allocation transmission resource pool which the UE is allowed to use only in exceptional cases and rely on mode-1 otherwise. The UE considers itself to be in exceptional conditions while T311 or T301 is running. In general, according to the Chairman's notes of the RAN2 #87 Meeting While T310 is running, the UE may use Mode-2 fallback resources.

The time delay involved in switching between Mode 1 and Mode 2 as a result of RLF based trigger conditions for exceptional cases as above described incur certain latency issues. The mode switching delay or latency needs to be reduced or mitigated for various reasons. For example, the mode switching latency needs to be mitigated so that D2D devices may comply with public safety requirements.

A present solution to this latency issue is to permit the wireless terminal to use Mode 2 even earlier, e.g., while another timer (known as the T310 timer) is running. The T310 is triggered by certain number of consecutive "Out-of-Sync" reports. Since the expiry of the T310 timer can be regarded as the trigger condition of RLF report, as well as the indication of exception case occurrence, this solution means the wireless terminal can use Mode-2 fallback resources before the exceptional case is declared.

The latency solution described above is directed only to an exceptional case caused by receipt of "Out-of-Sync" reports (and which uses the T310 timer). There are still other latency prone scenarios that arise in other circumstances or situations, including a random access procedure.

Figure 9:
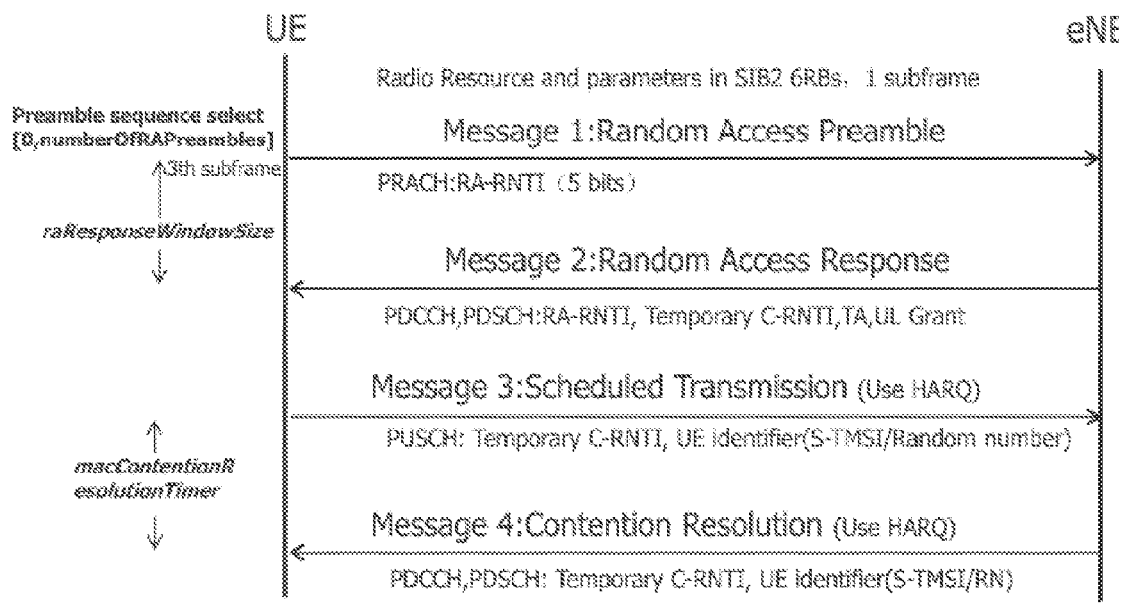
FIG. 9 is a diagrammatic view showing four steps of contention-based random access procedures.

Simply speaking, there are two types of random access procedures: contention-based and non-contention-based. For both types of random access procedures, if the wireless terminal encounters an uplink problem, the wireless terminal will increase its transmission power and resend a Random Access Preamble message. If in some certain time (random access response window) it fails again (the wireless terminal does not receive the random access response message from the eNB, or the received RA response message does not belong to this wireless terminal's Random Access Preamble message), the wireless terminal will repeat the previous step, until the maximum number of allowed random access attempts is reached and RLF is finally declared. For contention-based random access procedures, even when the wireless terminal receives a Random Access Response message successfully, if within some certain time, the wireless terminal does not receive "Contention Resolution" successfully (the wireless terminal does not receive the "Contention Resolution" from eNB, or the received "Contention Resolution" does not belong to this wireless terminal's random access procedure), the wireless terminal will repeat from the step of "increasing its transmission power and resending Random Access Preamble message", until the maximum number of allowed random access attempts is reached and RLF is finally declared. FIG. 9 shows four contention-based random access procedures or messages, among which the non-contention-based random access procedures only use the first two. The random access Response window starts at the subframe that contains the end of the preamble transmission plus three subframes and has length ra-ResponseWindowSize subframes.

In current practice, if a real uplink failure happens, for non-contention-based random access procedures, the wireless terminal may wait (3+ra-ResponseWindowSize)*PreambleTransMax to declare a radio link failure (RLF) occurrence. For non-contention based random access a maximum waiting time may be on the order of (3+10)*200=2600 sf=2600 ms and a mean waiting time may be on the order of (3+6)*100=900 sf=900 ms. For contention-based random access procedures, the wireless terminal may wait [3+raResponseWindowSize+mac-ContentionResolutionTimer+: Backoff Parameter value]*PreambleTransMax for a radio link failure (RLF) report. For contention based random access a maximum waiting time may be on the order of (3+10+64+960)*200=207400 ms and a mean waiting time may be on the order of (3+6+36+480)*100=52500 ms. From a public safety perspective, the above waiting times involve loss of too many voice frames and therefore are not acceptable.

In one of its aspects the technology disclosed herein concerns a method in a wireless terminal which is capable of wireless communications with a node of a radio access network over a radio interface. In a basic example embodiment and mode the method comprises providing both a first set of radio resources and a second set of radio resources. The first set of radio resources may be used by the wireless terminal when performing a device-to-device (D2D) communication with another wireless terminal when the wireless terminal is within coverage of a radio access network. The second set of radio resources may be used by the wireless terminal, e.g., when performing a device-to-device (D2D) communication with the other wireless terminal when the wireless terminal is not within coverage of the radio access network. The method further comprises allowing the wireless terminal, when still within coverage of the radio access network, to use the second set of resources for the device-to-device (D2D) communication in conjunction with a random access procedure.

In an example embodiment and mode the first set of radio resources and the second set of radio resources are stored in a memory, and the method further comprises a processor determining a resource switch-causing event of the random access procedure. Upon occurrence of the resource switch-causing event, the processor allows the wireless terminal to use the second set of resources for the device-to-device (D2D) communication in conjunction with the random access procedure.

In an example embodiment and mode the method further comprises allowing the wireless terminal, when still within the coverage of the radio access network, to use the second set of resources for the device-to-device (D2D) communication before occurrence of a radio link failure.

In an example embodiment and mode the method further comprises allowing the wireless terminal to use the second set of resources upon initiation of the random access procedure.

In an example embodiment and mode the method further comprises allowing the wireless terminal to use the second set of resources when a PDCCH order initiates the random access procedure.

In an example embodiment and mode the method further comprises allowing the wireless terminal to use the second set of resources when a medium access control (MAC) sublayer of the wireless terminal initiates the random access procedure.

In an example embodiment and mode the method further comprises allowing the wireless terminal to use the second set of resources upon receiving a predetermined number of unsuccessful random access response notifications.

In an example embodiment and mode the predetermined number of unsuccessful random access response notifications is less than a parameter preambleTransMax specified for the wireless terminal.

In an example embodiment and mode the method further comprises the wireless terminal receiving the predetermined number from the radio access network.

In an example embodiment and mode the method further comprises, upon receiving the predetermined number of unsuccessful random access response notifications, the wireless terminal switching from use of the first set of resources to the second set of resources.

In an example embodiment and mode the method further comprises, upon receiving the predetermined number of unsuccessful random access response notifications, indicating a radio link failure (RLF) and allowing the wireless terminal to use the second set of resources as a result of the RLF failure.

In an example embodiment and mode the method further comprises the wireless terminal switching from using the second set of resources to using the first set of resources upon determining that the random access procedure is successful.

In another of its aspects the technology disclosed herein concerns a wireless terminal which is capable of communicating over a radio interface with a node of a radio access network. In a basic example embodiment the wireless terminal comprises a processor configured to allocate a radio resource from a first set of radio resources which may be used by the wireless terminal, e.g., when performing a device-to-device (D2D) communication with another wireless terminal when the wireless terminal is within coverage of a radio access network and to allocate a radio resource from a second set of radio resources which may be used by the wireless terminal, e.g., when performing a device-to-device (D2D) communication with the another wireless terminal when the wireless terminal is not within coverage of the radio access network. The processor is further configured to allow the wireless terminal, when still within coverage of the radio access network, to use the second set of resources for the device-to-device (D2D) communication in conjunction with a random access procedure.

In an example embodiment and mode the wireless terminal comprises a memory configured to store the first set of radio resources and the second set of radio resources. The processor is configured to determine a resource switch-causing event of the random access procedure, and upon occurrence of the resource switch-causing event, to allow the wireless terminal to use the second set of resources for the device-to-device (D2D) communication in conjunction with the random access procedure.

In an example embodiment and mode the processor is configured to allow the wireless terminal, when still within the coverage of the radio access network, to use the second set of resources for the device-to-device (D2D) communication before occurrence of a radio link failure.

In an example embodiment and mode the processor is configured to allow the wireless terminal to use the second set of resources upon initiation of the random access procedure.

In an example embodiment and mode the processor is configured to allow the wireless terminal to use the second set of resources when a PDCCH order initiates the random access procedure.

In an example embodiment and mode the processor is configured to allow the wireless terminal to use the second set of resources when a medium access control (MAC) sublayer of the wireless terminal initiates the random access procedure.

In an example embodiment and mode the processor is configured to allow the wireless terminal to use the second set of resources upon receiving a predetermined number of unsuccessful random access response notifications.

In an example embodiment and mode the predetermined number of unsuccessful random access response notifications is less than a parameter preambleTransMax specified for the wireless terminal.

In an example embodiment and mode the processor is configured to receive the predetermined number from the radio access network.

In an example embodiment and mode, upon receiving the predetermined number of unsuccessful random access response notifications, the processor is configured to switch the wireless terminal from use of the first set of resources to the second set of resources.

In an example embodiment and mode, upon receiving the predetermined number of unsuccessful random access response notifications, the processor is configured to indicate a radio link failure (RLF) and allow the wireless terminal to use the second set of resources as a result of the RLF failure.

In an example embodiment and mode the processor is further configured to switch the wireless terminal from using the second set of resources to using the first set of resources upon further determining that the random access procedure is successful.

FIG. 1 shows an example communications system 20 comprising radio access node 22. The access node 22 may communicate over air or radio interface 24 with first wireless terminal $26_1$, depending on respective locations and coverage of access node 22. The node 22 comprises node processor 30 and node transmitter 32. The node transmitter 32 may comprise or be connected to plural antenna 33. The first wireless terminal $26_1$ comprises terminal processor 40 and terminal transceiver 42. The terminal transceiver 42 may comprise or be connected to plural antenna 43. The terminal transceiver 42 typically comprises terminal transmitter section 44 and terminal receiver section 46. The node transmitter 32 of node 22 and the terminal transceiver 42 of wireless terminal $26_1$ both serve as radio frequency interfaces. A radio frequency (RF) interface typically comprises units generally found in a RF front end, including (on the transmitter side) amplifiers, modulators, encoders, etc., and (on the receiver side) amplifiers, filters, and demodulators, decoders, time and frequency synchronization circuitry and on both transmitter and receiver additional control logic circuitry that governs the way the transmitter and receiver are used to access the cellular network.

In general operation, when access node 22 and first wireless terminal $26_1$ communicate with each other, they may do so across radio interface 24 using "frames" of information that are typically formatted and/or prepared by a scheduler of node 22. A frame may be divided into plural subframes. For example, in operation receiver 46 of first wireless terminal $26_1$ may receive subframe S communicated over radio interface 24 from communications system 20. In Long Term Evolution (LTE) a frame, which may have both downlink portion(s) and uplink portion(s), is communicated between the node and the wireless terminal. On both the downlink and the uplink a frame may include both control information (e.g., control channels) and user data (data channels). The terminal processor 40 of wireless terminal $26_1$ includes a frame handler 48 which serves, e.g., to obtain, deformat, and process the downlink information included in a frame, and which further serves, e.g., to format and include information14 (either control or data) that is to be included in uplink portions of a frame.

As mentioned above, in some instances wireless terminals may communicate with one another without having those communications transmitted through the node 22. Such terminal-to-terminal communications are also called device-to-device (D2D) communications or sidelink direct (SL) communications. The D2D/SL communications between wireless terminals may also be expressed in terms of frames (or subframes) that are transmitted over an air or radio interface. Hereinafter D2D/SL communications will primarily be described from the perspective of one wireless terminal, despite the fact that two wireless terminals (such as wireless terminal $26_1$ and $26_2$) are involved. Hence, for sake of simplicity, reference to a wireless terminal generally will hereinafter be without subscripts, e.g., wireless terminal 26.

The terminal processor 40 of wireless terminal 26 may include D2D/SL controller 50 which, e.g., facilitates, implements, and/or supervises the D2D/SL communications. At some times the device-to-device (D2D/SL) communications may be under network control or "in-coverage", meaning that one or more of the wireless terminal involved in the device-to-device (D2D/SL) communications may be within range of radio frequencies utilized by a node or cell of a radio access network (RAN). When the wireless terminal 26 is "in-coverage" and engages in device-to-device (D2D) communications the device-to-device (D2D) communications are generally those of a first mode, or Mode 1, D2D/SL communications. When in-coverage, in conjunction with device-to-device (D2D/SL) communications the terminal processor 40 may obtain a device-to-device (D2D/SL) grant from the subframe S. The device-to-device (D2D/SL) grant may specify radio resources that first wireless terminal $26_1$ is permitted to use for device-to-device (D2D/SL) communication with another wireless terminal, e.g., second wireless terminal $26_2$. In Mode 1 the transmitter 44 of first wireless terminal $26_1$ may serve, e.g., to transmit data on the uplink (UL) from first wireless terminal $26_1$ to node 22, but may also serve to transmit device-to-device (D2D/SL) data to another wireless terminal(s), e.g., second wireless terminal $26_2$, using the radio resources permitted by the D2D/SL grant.

At some times the device-to-device (D2D/SL) communications may not be under network control or "out-of-coverage", meaning that the wireless terminals involved in the device-to-device (D2D/SL) communications are out of range of radio frequencies utilized by a node or cell of a radio access network (RAN). D2D/SL communications that occur when the wireless terminal 26 is "out-of-coverage" are also known as a second mode, or Mode 2, D2D/SL communications. When out-of-coverage, the wireless terminal on its own selects resources from resource pools to transmit direct data and direct control information to another wireless terminal when engaging in D2D/SL communications.

D2D/SL controller 50 governs D2D/SL communications in both Mode 1 and Mode 2. The D2D/SL controller 50 comprises mode selector 52 which determines, e.g., whether the wireless terminal 26 should operate in Mode 1 or Mode 2, e.g., whether the wireless terminal 26 is in-coverage or out-of-coverage of the radio access network, and selects between Mode 1 and Mode 2 operation accordingly.

Different radio resources are available for D2D/SL communications by the wireless terminal depending on whether the D2D/SL communication is in accordance with Mode 1 or Mode 2. To this end, from the perspective of a transmitting wireless terminal FIG. 1 shows wireless terminal 26 as comprising non-transient memory 54 in which are stored a listing and identification of radio resources available for allocation for use with Mode 1 (Mode 1 resources 56) and a listing and identification of radio resources known as Mode 2 resources (Mode 2 resources 58).

Mode 1 resources 56 are those for which an eNodeB or Release-10 relay node schedules the exact resources to be used by wireless terminal 26 to transmit direct data and direct control information for D2D/SL communications. Without such scheduling or allocation, the wireless terminal 26 cannot use Mode 1 resources. It is said herein that the Mode 1 resources 56 "may" be used (by the wireless terminal when performing a device-to-device (D2D/SL) communication with another wireless terminal when the wireless terminal) in the sense that either Mode 1 resources or Mode 2 resources may be used in Mode 1, depending upon the configuration or signaling from the eNodeB and whether an exceptional case has been determined.

On the other hand, the Mode 2 resources 58 are from those which the wireless terminal 26 on its own selects to transmit direct data and direct control information for D2D/SL communications. Most often the Mode 2 resources are utilized when the wireless terminal 26 is out of coverage, but as indicated above the eNodeB may configure or signal the wireless terminal 26 to use Mode 2 resources during Mode 1 operation. It is said herein that the Mode 2 resources 56 may be used (by the wireless terminal when performing a device-to-device (D2D/SL) communication with another wireless terminal) in the sense that Mode 2 resources must be used when the wireless terminal is in Mode 2, but Mode 2 resources may also be used in Mode 1 depending upon the configuration or signaling from the eNodeB and whether an exceptional case has been determined.

Thus, the first set of radio resources (Mode 1 resources 56) can only be used by the wireless terminal when performing a device-to-device (D2D/SL) communication with another wireless terminal when the wireless terminal is within coverage of a radio access network. However, the wireless terminal may (if so configured or signal) use Mode 2 resources during Mode 1 operation. When the wireless terminal is not within coverage the must use the second set of radio resources (e.g., Mode 2 resources 58) when performing a device-to-device (D2D/SL) communication with the other wireless terminal. The second set of resource pool is used for out of coverage, but can also be used within coverage, even when exception case occurs. (Mode 2 can be used for both in coverage and out of coverage, for in coverage scenario, it could be used for both of normal case and exceptional case.)

The operation of D2D/SL controller 50 concerning D2D/SL communications in general includes allocation of resources for Mode 1 and Mode 2, and the operation of mode selector 52 in particular includes determining the appropriate mode.

The mode selector 52, which may comprise D2D/SL controller 50 and which may be realized by a processor, allocates a radio resource from a first set of radio resources (e.g., Mode 1 resources 56) which may be used by the wireless terminal 26 when performing a device-to-device (D2D/SL) communication with another wireless terminal when the wireless terminal 26 is within coverage of a radio access network, and allocates a radio resource from a second set of radio resources (e.g., Mode 2 resources 58) which may be used by the wireless terminal 26 when performing a device-to-device (D2D/SL) communication with the another wireless terminal when the wireless terminal is not within coverage of the radio access network.

The D2D/SL controller 50, and indeed mode selector 52, may further comprise random access procedure mode selector 60, also known as random access procedure exceptional case selector 60. In basic operation, random access procedure mode selector 60 allows the wireless terminal 26, when still within coverage of the radio access network, to use the Mode 1 resources 56 or the second set of resources (e.g., Mode 2 resources 58) for the device-to-device (D2D/SL) communication in conjunction with a random access procedure. The random access procedure mode selector 60 may also be realized by a processor, e.g., the same or different processor as comprises one or both of D2D/SL controller 50 and mode selector 52, which may be or comprise terminal processor 40.

FIG. 2A shows basic, representative acts or steps comprising a method of operating the wireless terminal 26 of FIG. 1. Act 2A-1 comprises providing a first set of radio resources (e.g., Mode 1 resources 56) to be used by the wireless terminal 26, when performing a device-to-device (D2D/SL) communication with another wireless terminal when the wireless terminal 26 is within coverage of a radio access network. Act 2A-2 comprises providing a second set of radio resources (e.g., Mode 2 resources 58). The second set of radio resources 58 may be resources that are available for use by the wireless terminal, e.g., when performing a device-to-device (D2D/SL) communication with the another wireless terminal when the wireless terminal is not within coverage of the radio access network. Act 2A-3 comprises allowing the wireless terminal 26, when still within coverage of the radio access network (e.g., within coverage of access node 22), to use the second set of resources for the device-to-device (D2D/SL) communication in conjunction with a random access procedure.

Figure 2B:
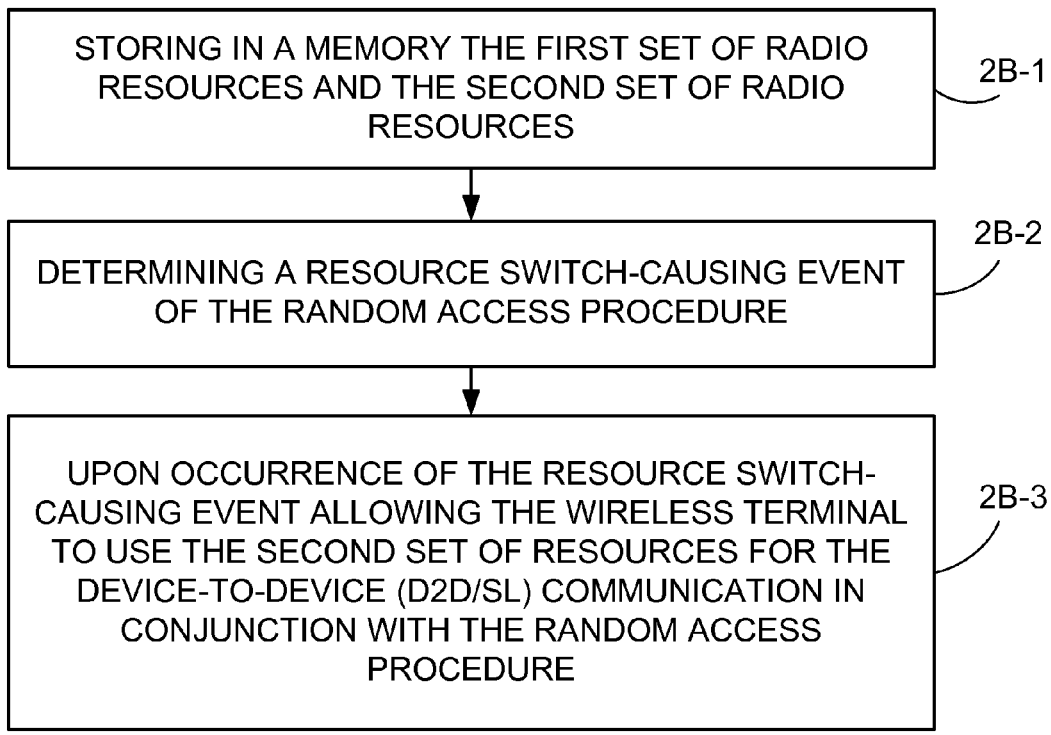
FIG. 2B is a flowchart depicting basic, example acts or steps involved in a processor-based method of operating a wireless terminal which may select Mode 2 resources in conjunction with a random access procedure.

FIG. 2B shows basic, representative acts or steps comprising a method of operating the wireless terminal 26 of FIG. 1 according to a different perspective. Act 2B-1 comprises storing in a memory (e.g., memory 54) the first set of radio resources (e.g., Mode 1 resources 56) and the second set of radio resources (e.g., Mode 2 resources 58). Act 2B-2 comprises a processor, e.g., random access procedure mode selector 60, determining a resource switch-causing event of the random access procedure. Act 2B-3 comprises, upon occurrence of the resource switch-causing event, the processor, e.g., random access procedure mode selector 60, allowing the wireless terminal to use the second set of resources (instead of the first set of resources) for the device-to-device (D2D/SL) communication in conjunction with the random access procedure. Thus, according to the method of FIG. 2B, the mode random access procedure mode selector 60 determines a resource switch-causing event of the random access procedure. Upon occurrence of the resource switch-causing event, the random access procedure mode selector 60 allows wireless terminal 26 to use the second set of resources (e.g., Mode 2 resources 58) rather than the first set of resources (e.g., Mode 1 resources 56) for the device-to-device (D2D/SL) communication in conjunction with the random access procedure.

Figure 3:
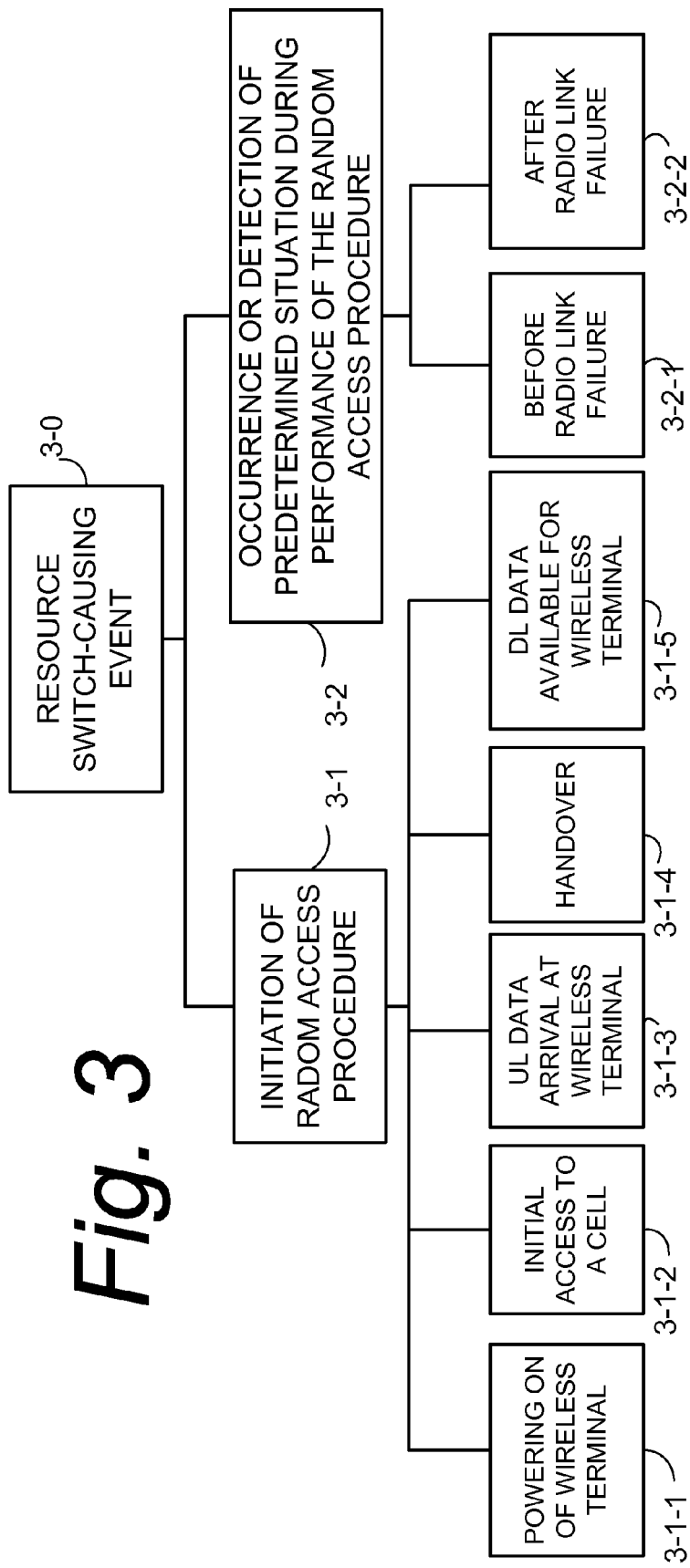
FIG. 3 is a diagrammatic view depicting different types of events that may comprise a resource switch-causing event of FIG. 2B.

FIG. 3 illustrates that, in differing embodiments and modes, the resource switch-causing event of FIG. 2B, also known as resource switch-causing event 3-0, may take differing forms. For example, in some example embodiments and modes the resource switch-causing event 3-0 may comprise initiation of the random access procedure (event 3-1). In other example embodiments and modes the resource switch-causing event 3-0 may comprise occurrence or detection of predetermined situation during performance of the random access procedure (event 3-2).

FIG. 3 further illustrates several, non-exhaustive and non-limiting ways in which initiation of the random access procedure (event 3-1) may occur. As a first example, the random access procedure may be initiated by powering on of the wireless terminal (event 3-1-1).

The random access procedure may be also initiated by the wireless terminal making initial access to a cell (event 3-1-2). Event 3-1-2 may occur, for example, when a wireless terminal initially camps on a cell and tries to exchange information with the access node 22 for the camped-on cell.

The random access procedure may be also initiated by uplink (UL) data arrival at the wireless terminal (event 3-1-3). For uplink data arrival is triggered by a UE Buffer Status Report when the wireless terminal has data to transmit on the uplink (UL) to the network. Event 3-1-3 is an example of a situation in which the random access procedure mode selector 60 allows the wireless terminal to use the second set of resources when a medium access control (MAC) sublayer of the wireless terminal initiates the random access procedure.

The random access procedure may be also initiated by a handover (event 3-1-4).

The random access procedure may be also initiated by when there is downlink (DL) data for the wireless terminal (event 3-1-5). An example of a situation in which there is downlink data for the wireless terminal is an incoming call to the wireless terminal. In such case the access node 22 (e.g., eNB) uses a paging message to wake up the wireless terminal in RRC_IDLE mode, at which point the wireless terminal needs to move from RRC_IDLE mode to RRC_CONNECTED mode, so the wireless terminal needs to set up uplink connection with eNB. The random access procedure being initiated by when there is downlink (DL) data for the wireless terminal (event 3-1-5) is an example of a PDCCH order initiating the random access procedure (event 3-1P).

FIG. 3 further illustrates several non-limiting, non-exhaustive situations in which the resource switch-causing event 3-0 may comprise occurrence or detection of a predetermined situation during performance of the random access procedure (event 3-2). As illustrated in FIG. 3, in some example modes and embodiments the occurrence or detection of predetermined situation of event 3-2 may be such as to facilitate the resource switch (from Mode 1 resources 56 to Mode 2 resources 58) before actual occurrence of a radio link failure (RLF), such pre-RLF resource switch being depicted by event 3-2-1. On the other hand, in other example modes and embodiments the occurrence or detection of predetermined situation of event 3-2 may be such that the resource switch (from Mode 1 resources 56 to Mode 2 resources 58) occurs after a radio link failure (RLF) but earlier than legacy communication of such radio link failure (RLF), such post-RLF resource switch being depicted by event 3-2-2.

Figure 4:
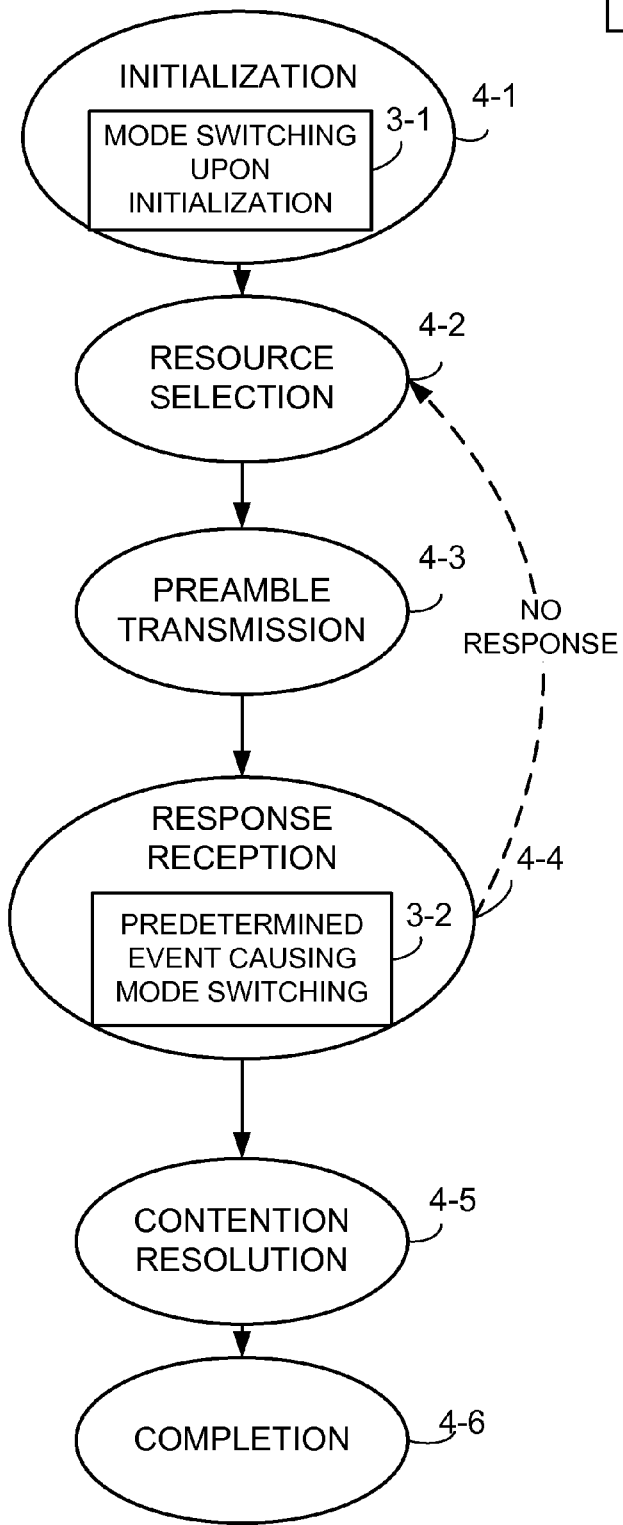
FIG. 4 is a diagrammatic view depicting various resource switch-causing events in context of basic aspects or stages of a random access procedure.
Figure 5:
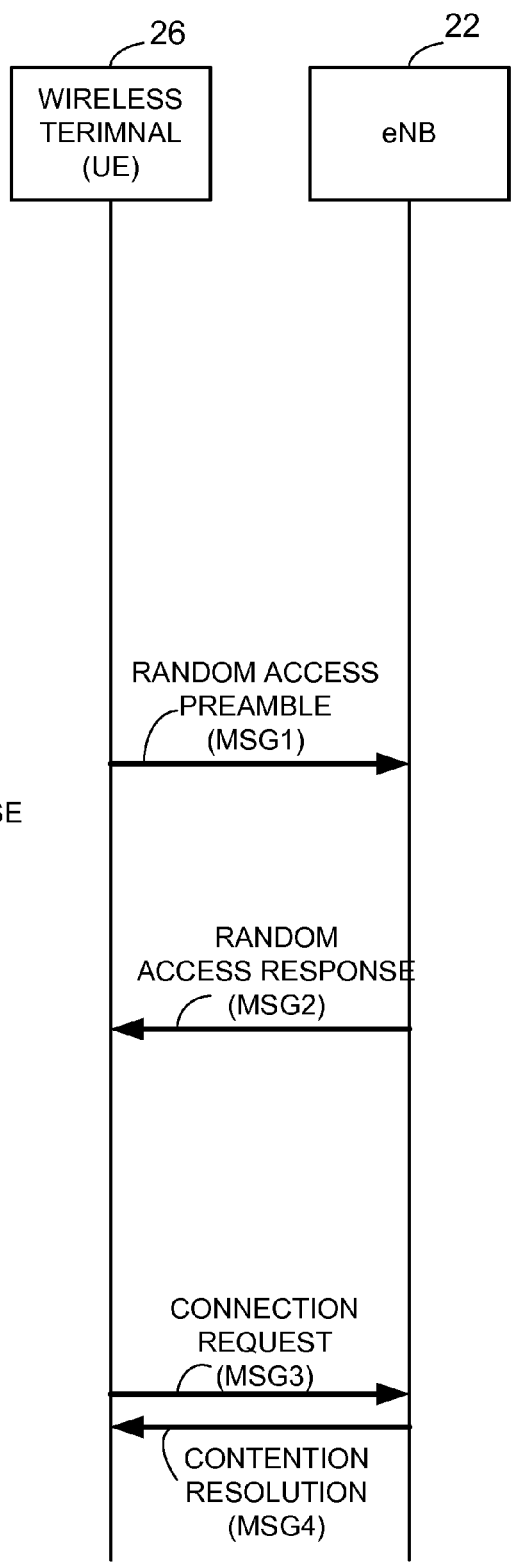
FIG. 5 is a diagrammatic view depicting, in timed relation to stages of FIG. 4, various messages which are transmitted between a wireless terminal engaging in random access procedure and a radio access node.

FIG. 4 shows various resource switch-causing events 3-0 in context of basic aspects or stages of a generic random access procedure, e.g., stage 4-1 through stage 4-6. FIG. 5 shows, in timed relation to stages of FIG. 4, various messages which are transmitted between a wireless terminal (e.g., wireless terminal 26) engaging in random access procedure and a radio access node, e.g., access node 22.

Stage 4-1 of the random access procedure of FIG. 4 is an initialization stage. In order for initialization of the random access procedure to occur, certain information related to the Serving Cell should be available, including but not limited to groups of random access preambles and a set of available random access preambles as well as a parameter that describes a maximum number of preamble transmissions (preambleTransMax). During the initialization stage 4-1 the following acts or steps may occur: flushing a buffer known as the Msg3 buffer; setting a counter PREAMBLE_TRANSMISSION_COUNTER to 1; setting a backoff parameter value in the wireless terminal to 0 ms; and, for a relay node, suspend any relay node subframe configuration. In addition, as mentioned above, upon initialization of the random access procedure the random access procedure mode selector 60 may (as reflected by event 3-1 [see FIG. 3]) allow the wireless terminal to access the Mode 2 resources 58 instead of the Mode 1 resources 56 in conjunction with the random access procedure.

Stage 4-2 of the random access procedure comprises resource selection. The resource selection stage 4-2 comprises selection by the wireless terminal 26 of a random access preamble. Selection of the random access preamble may depend on whether the random access preamble and a PRACH Mask Index have been explicitly signaled. If not, the wireless terminal may select a random access preamble using rules based on whether a message Msg3 has been transmitted or is being retransmitted and whether Random Access Preamble group B exists and a message size. The resource selection stage 4-2 may also comprise selection of a Physical Random Access Channel (PRACH).

Stage 4-3 of the random access procedure comprises preamble transmission. The preamble transmission stage 4-3 comprises setting a power level for the transmission and instructing the physical layer to transmit, e.g., a preamble using the selected PRACH, corresponding random access Radio Network Temporary Identifier (RA-RNTI [5 bits]) for the wireless terminal, and preamble index. The preamble transmission of stage 4-3 may involving sending of message MSG1 as shown in FIG. 5, and inclusion of one or more of the just-mentioned informations to the access node 22 using message MSG1 (Random Access Preamble).

Stage 4-4 of the random access procedure comprises random access response reception. In the random access response reception stage 4-4 the wireless terminal monitors the PDCCH for random access responses (e.g., MSG2 of FIG. 5). If received, the random access response of MSG2 may include the random access Radio Network Temporary Identifier (RA-RNTI), Cell Radio Network Temporary Identifier (C-RNTI), Timing Advance (TA), and an uplink (UL) Grant.

If no Random Access Response is received within a random access response window (raResponseWindowSize), or if none of all received Random Access Responses contains a Random Access Preamble identifier corresponding to the transmitted Random Access Preamble, the Random Access Response reception is considered not successful and the wireless terminal determines whether to send another random access request. If the wireless terminal is eligible for another random access request, the wireless terminal increments a counter (PREAMBLE_TRANSMISSION_COUNTER) and loops back to repeat each of stage 4-3, stage 4-4, and stage 4-5, as shown by the broken line in FIG. 4. In other words, if the Random Access Response reception was considered not successful, the wireless terminal (at stage 4-3) selects another preamble which (as stage 4-4) is transmitted to the network node and for which (at stage 4-5) a random access response is awaited. As understood from an ensuing discussion, the process of selecting another random access preamble (stage 4-3), transmitting the random access preamble to the network (stage 4-4), and awaiting a random access response (stage 4-5) may be repeated numerous times in hopes of obtaining a successful random access response. The loop of stage 4-3, stage 4-4, and stage 4-5 may be repeated a number of times until the counter PREAMBLE_TRANSMISSION_COUNTER is incremented to reach a network-specified value preambleTransMax.

As shown in FIG. 4 and herein further described with reference to FIG. 6A and FIG. 6B, a predetermined situation of event 3-2 (see FIG. 3) that causes resource switching may occur in the random access response reception stage 4-4.

Assuming that the random access response reception stage 4-4 proceeds satisfactorily, in at least some example embodiments and modes stage 4-5 may occur. Stage 4-5 comprises contention resolution of the random access procedure, and thus is only applicable to contention-based types of random access procedures. In the contention resolution of stage 4-5 the wireless terminal may send a RRC connection request message (MSG3). The RRC connection request message (MSG3) may include the an identity of the wireless terminal as well as a connection establishment cause. The access node 22 may respond with a contention resolution message (MSG4) to the wireless terminal whose message MSG3 was successfully received. If the contention resolution of stage 4-5 is successful, stage 4-6 comprises completion of the random access procedure.

Figure 6A:
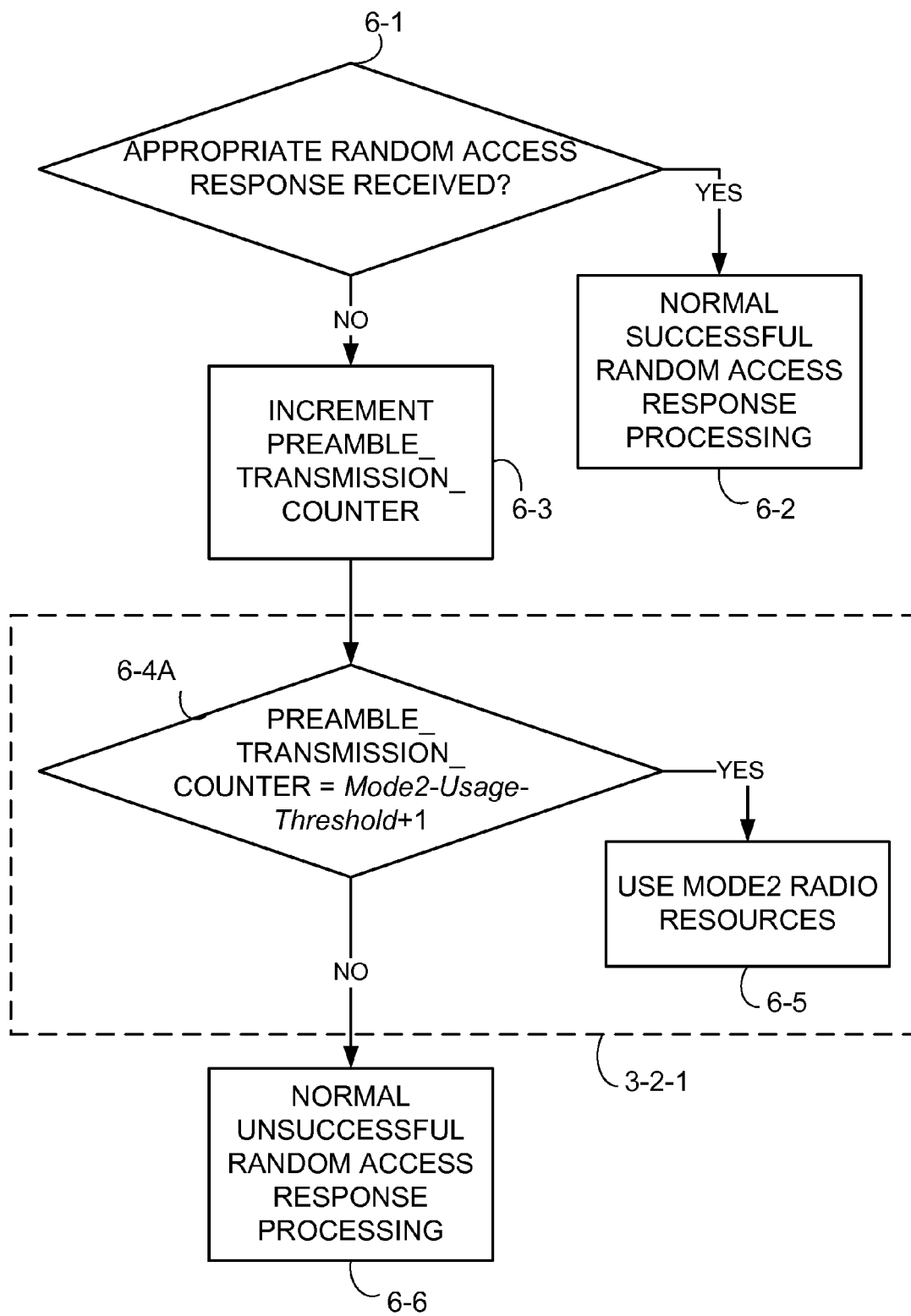
FIG. 6A and FIG. 6B are flowcharts showing selected acts of steps comprising random access response reception stage 4-4 according to two different, representative example embodiments and modes.
Figure 6B:
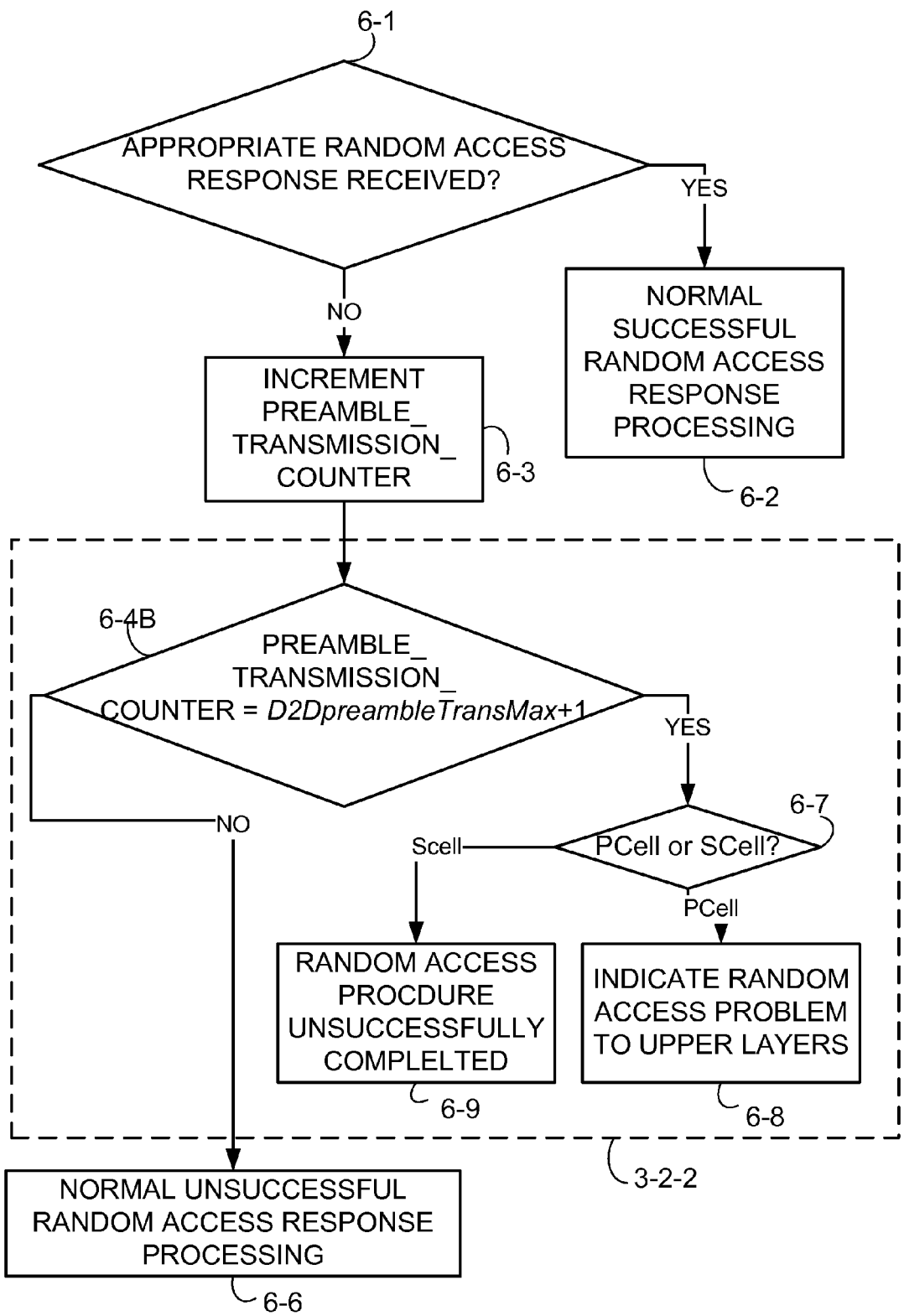

FIG. 6A and FIG. 6B show selected acts or steps comprising random access response reception stage 4-4 according to two different, representative example embodiments and modes. FIG. 6A particularly shows selected acts of steps comprising random access response reception stage 4-4 according to an example embodiment and mode wherein an event such as event 3-2-1 results in a resource switch (from Mode 1 resources 56 to Mode 2 resources 58) before actual occurrence of a radio link failure (RLF). On the other hand, FIG. 6B particularly shows selected acts of steps comprising random access response reception stage 4-4 according to an example embodiment and mode wherein an event such as event 3-2-2 results in a resource switch (from Mode 1 resources 56 to Mode 2 resources 58) after actual occurrence of a radio link failure (RLF), but earlier than for legacy wireless terminals.

Act 6-1 of FIG. 6A shows terminal processor 40 determining whether an appropriate random access response was received during random access response reception stage 4-4. If an appropriate random access response was received, random access response reception stage 4-4 is completed according to normal random access procedure processing as reflected by act 6-2. If an appropriate random access response was not received, as act 6-3 the counter PREAMBLE_TRANSMISSION_COUNTER is incremented. After the incrementation of act 6-3, as act 6-4A the random access procedure mode selector 60 determines whether the incremented value of PREAMBLE_TRANSMISSION_COUNTER has reached a value Mode2-Usage-Threshold+1. If the incremented value of PREAMBLE_TRANSMISSION_COUNTER has reached the value Mode2-Usage-Threshold+1, as act 6-5 the random access procedure mode selector 60 enables the wireless terminal 26 to use the Mode 2 resources 58 instead of the Mode 1 resources 56, even though the wireless terminal 26 is still considered within network coverage. If the incremented value of PREAMBLE_TRANSMISSION_COUNTER has not yet reached the value Mode2-Usage-Threshold+1, as act 6-6 the random access response reception stage 4-4 continues with normal unsuccessful random access response processing. The normal unsuccessful random access response processing of act 6-6 may include one or more repetitions of selecting another random access preamble (stage 4-3), transmitting the random access preamble to the network (stage 4-4), and awaiting another random access response (stage 4-5).

The parameter Mode2-Usage-Threshold for device-to-device (D2D/SL) random access is set so as not to exceed the value of the parameter preambleTransMax. The parameter Mode2-Usage-Threshold may be obtained from the radio access network, e.g., may be included in an information element "RACH-ConfigCommon", or other broadcast signaling, or other dedicated signaling, to the wireless terminal 26.

Thus, in the example embodiment and mode of FIG. 6A, the random access procedure mode selector 60 allows the wireless terminal to use the second set of resources (e.g., Mode 2 resources 58) upon receiving a predetermined number of unsuccessful random access response notifications, e.g., Mode2-Usage-Threshold+1 number of unsuccessful random access response notifications.

The acts of FIG. 6A are understood in context of the random access response reception stage 4-4 from example instructions shown in Table 1.

TABLE 1 increment PREAMBLE_TRANSMISSION_COUNTER by 1;
If PREAMBLE_TRANSMISSION_COUNTER = Mode2-Usage-Threshold + 1:
    the D2D/SL UE may use Mode 2 resources
If PREAMBLE_TRANSMISSION_COUNTER = preambleTransMax + 1:
    if the Random Access Preamble is transmitted on the PCell:
        indicate a Random Access problem to upper layers;
    if the Random Access Preamble is transmitted on an SCell:
        consider the Random Access procedure unsuccessfully completed.
if in this Random Access procedure, the Random Access Preamble was selected by MAC:
    based on the backoff parameter in the UE, select a random
    backoff time according to a uniform distribution between 0
    and the Backoff Parameter Value;
    delay the subsequent Random Access transmission by the
    backoff time;
proceed to the selection of a Random Access Resource In legacy or conventional communication technology, the D2D/SL wireless terminal can use Mode 2 resources after PreambleTransMax is reached, at which point the radio link failure (RLF) is detected. In the example embodiment and mode of FIG. 6A of the technology disclosed herein, on the other hand, the D2D/SL wireless terminal can use Mode 2 resources before PreambleTransMax is reached and thus before RLF is detected since a switch to Mode 2 resources occurs when Mode2-Usage-Threshold is reached (Mode2-Usage-Threshold being less than or equal to PreambleTransMax).

FIG. 6B shows selected acts of steps comprising random access response reception stage 4-4 according to an example embodiment and mode wherein an event such as event 3-2-2 results in a resource switch (from Mode 1 resources 56 to Mode 2 resources 58) after actual occurrence of a radio link failure (RLF), but earlier than for legacy wireless terminals. Some acts of FIG. 6B resemble those of FIG. 6A, and accordingly are similarly numbered.

Act 6-1 of FIG. 6B shows terminal processor 40 determining whether an appropriate random access response was received during random access response reception stage 4-4. If an appropriate random access response was received, random access response reception stage 4-4 is completed according to normal random access procedure processing as reflected by act 6-2. If an appropriate random access response was not received, as act 6-3 the counter PREAMBLE_TRANSMISSION_COUNTER is incremented. After the incrementation of act 6-3, as act 6-4B the random access procedure mode selector 60 determines whether the incremented value of PREAMBLE_TRANSMISSION_COUNTER has reached a value D2DpreambleTransMax+1. If the incremented value of PREAMBLE_TRANSMISSION_COUNTER has not reached the value D2DpreambleTransMax+1, as act 6-6 the random access response reception stage 4-4 continues with normal unsuccessful random access response processing. The normal unsuccessful random access response processing of act 6-6 may include one or more repetitions of selecting another random access preamble (stage 4-3), transmitting the random access preamble to the network (stage 4-4), and awaiting another random access response (stage 4-5).

If it is determined as act 6-4B that the incremented value of PREAMBLE_TRANSMISSION_COUNTER has reached the value D2DpreambleTransMax+1, a check is made as act 6-7 whether the random access preamble is transmitted on a primary cell (PCell) or a secondary cell (SCell). If the random access preamble is transmitted on a primary cell (PCell), as act 6-8 a Random Access problem is indicated to upper layers. The Random Access problem may be communicated, for example, by a message generated at the medium access control (MAC) layer and sent to the radio resource control (RRC) layer. As a result of act 6-8, the indication of the random access problem triggers a radio link failure (RLF) report and also triggers the timer T311 or the timer T301. The wireless terminal then considers itself to be in exceptional conditions and may use Mode 2 resources (e.g., Mode 2 resources 58) provided by the current cell. Thus, as act 6-8 the terminal processor 40 indicates a radio link failure (RLF) and the wireless terminal is allowed to use the second set of resources as a result of the RLF failure.

If the random access preamble is transmitted on a secondary cell (SCell) as act 6-9 the Random Access procedure is considered unsuccessfully completed. As a result of unsuccessful completion the terminal processor 40 performs various conventional actions, such as discarding certain explicitly signaled parameters, flushing certain buffers, etc.

The parameter D2DpreambleTransMax for device-to-device (D2D/SL) random access is set so as not to exceed (e.g., is less than or equal to) the value of the parameter preambleTransMax. The parameter D2DpreambleTransMax may be obtained from the radio access network, e.g., may be included in an information element "RACH-ConfigCommon", or other broadcast signaling, or other dedicated signaling, to the wireless terminal 26.

The acts of FIG. 6B are understood in context of the random access response reception stage 4-4 from example instructions shown in Table 2.

TABLE 2 increment PREAMBLE_TRANSMISSION_COUNTER by 1;
If PREAMBLE_TRANSMISSION_COUNTER =
D2DpreambleTransMax + 1:
    if the Random Access Preamble is transmitted on the PCell:
        indicate a Random Access problem to upper layers;
    if the Random Access Preamble is transmitted on an SCell:
        consider the Random Access procedure unsuccessfully
        completed.
if in this Random Access procedure, the Random Access Preamble was
selected by MAC:
    based on the backoff parameter in the UE, select a random backoff
    time according to a uniform distribution between 0 and the Backoff
    Parameter Value;
    delay the subsequent Random Access transmission
    by the backoff time;
proceed to the selection of a Random Access Resource In legacy or conventional communication technology, the D2D/SL wireless terminal can use Mode 2 resources after PreambleTransMax is reached, at which point the radio link failure (RLF) is detected. In the example embodiment and mode of FIG. 6B of the technology disclosed herein, on the other hand, the D2D/SL wireless terminal essentially declares a radio link failure (RLF) the value D2DpreambleTransMax is reached, at which point the wireless terminal can use the Mode 2 radio resources. Thus the D2D/SL wireless terminal can use the Mode 2 resources earlier than would a conventional or legacy wireless terminal (which would have declared the radio link failure (RLF) at a later time dependent on reaching the larger value PreambleTransMax).

It was mentioned above that certain parameters may be obtained from an information element "RACH-ConfigCommon". The information element "RACH-ConfigCommon" is understood with reference to Table 3 below.

TABLE 3

RACH-ConfigCommon information element

```
-- ASN1START
RACH-ConfigCommon ::=   SEQUENCE {
    preambleInfo                          SEQUENCE {
        numberOfRA-Preambles                  ENUMERATED {
                                                  n4, n8, n12, n16 ,n20, n24, n28,
                                                  n32, n36, n40, n44, n48, n52, n56,
                                                  n60, n64},
        preamblesGroupAConfig                 SEQUENCE {
            sizeOfRA-PreamblesGroupA              ENUMERATED {
                                                      n4, n8, n12, n16 ,n20, n24, n28,
                                                      n32, n36, n40, n44, n48, n52, n56,
                                                      n60},
            messageSizeGroupA                     ENUMERATED {b56, b144, b208, b256},
            messagePowerOffsetGroupB              ENUMERATED {
                                                      misusinfinity, dB0, dB5, dB8, dB10, dB12,
                                                      dB15, dB18},
            ...
        } OPTIONAL                            -- Need OP
    },
```

TABLE 3-continued

| RACH-ConfigCommon information element | |
|---|---|
| powerRampingParameters | PowerRampingParameters, |
| ra-SupervisionInfo | SEQUENCE { |
|   preambleTransMax | PreambleTransMax, |
|   ra-ResponseWindowSize | ENUMERATED { |
| | sf2, sf3, sf4, sf5, sf6, sf7, |
| | sf8, sf10}, |
|   mac-ContentionResolutionTimer | ENUMERATED { |
| | sf8, sf16, sf24, sf32, sf40, sf48, |
| | sf56, sf64} |
| }, | |
| maxHARQ-Msg3Tx | INTEGER {1 .. 8}, |
| . . . | |
| } | |
| PreambleTransMax ::= | ENUMERATED { |
| | n3, n4, n5, n6, n7, n8, n10, n20, n50, |
| | n100, n200} | preambleTransMax
Maximum number of preamble transmission. Value is an integer. Value n3 corresponds to 3, n4 corresponds to 4 and so on.
ra-ResponseWindowSize
Duration of the RA response window. Value in subframes. Value sf2 corresponds to 2 subframes, sf3 corresponds to 3 subframes and so on. The same value applies for each serving cell (although the associated functionality is performed independently for each cell).
mac-ContentionResolutionTimer
Timer for contention resolution. Value in subframes. Value sf8 corresponds to 8 subframes, sf16 corresponds to 16 subframes and so on.
maxHARQ-Msg3Tx
Maximum number of Msg3 HARQ transmissions, used for contention based random access. Value is an integer.
Msg3: Message transmitted on UL-SCH containing a C-RNTI MAC CE or CCCH SDU, submitted from upper layer and associated with the UE Contention Resolution Identity, as part of a random access procedure.

| Backoff Parameter values. | |
|---|---|
| Index | Backoff Parameter value (ms) |
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

The reserved values of the backoff parameter if received by the current release version UEs may be taken as 960 ms.

Each of the resource switch situations caused by events such as event 3-1, event 3-2-1 (FIG. 6A), and event 3-2-1 (FIG. 6B), may be applied to contention-based random access procedures, non-contention based random access procedures, or both contention-based random access procedures and non-contention based random access procedures.

Figure 7:
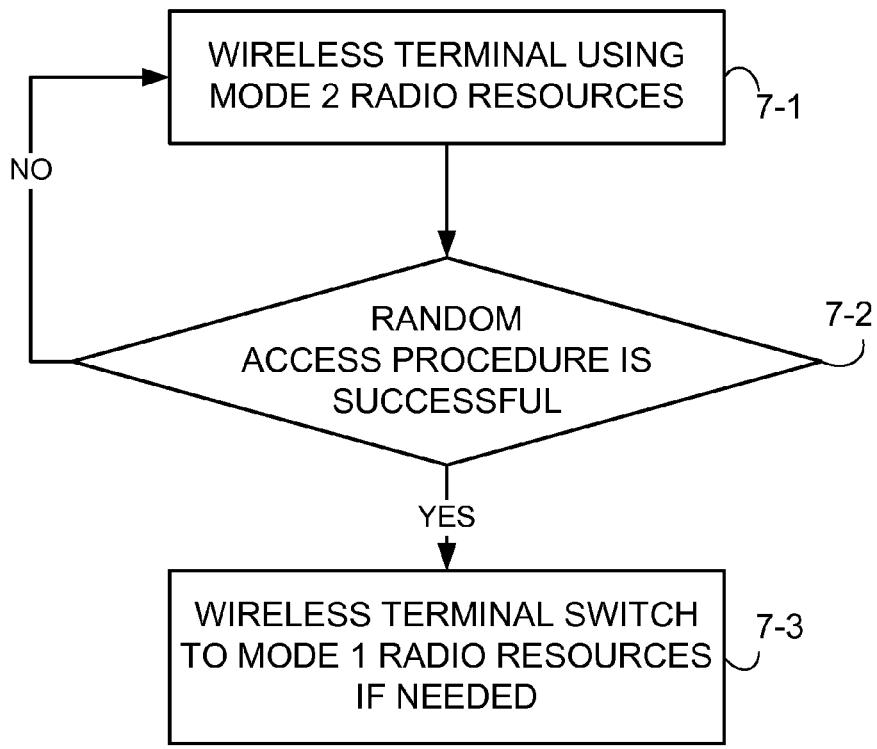
FIG. 7 is a flowchart showing example, representative acts or steps involved in a variation of the method of FIG. 2A or the method of FIG. 2B.

FIG. 7 shows example, representative acts or steps involved in a variation of the method of FIG. 2A or the method of FIG. 2B. In particular, act 7-1 shows that the wireless terminal 26 may be using Mode 2 radio resources (e.g., Mode 2 resources 58) as a result of a mode switch implemented by random access procedure mode selector 60. The use of Mode 2 radio resources at act 7-1 may have resulted from performance of act 2A-3 of FIG. 2A or act 2B-3 of FIG. 2B. The random access procedure mode selector 60 may have allowed the switch to Mode 2 radio resources either as a result of event 3-1 (upon initiation of a random access procedure) or upon occurrence or detection of predetermined situation during performance of the random access procedure (event 3-2). In the latter regard, the event 3-2 may have been event 3-2-1 (see FIG. 6A) or event 3-2-2 (see FIG. 6B).

Act 7-2 depicts the terminal processor 40 making a determination that the random access procedure is successful. If as act 7-2 the terminal processor 40 determines that the random access procedure is successful for any reason, as act 7-3 the mode selector 52 may allow the wireless terminal 26 to return to use of the Mode 1 radio resources (e.g., Mode 1 resources 56) if appropriate. Thus, as understood with reference to FIG. 7, in an example embodiment and mode the terminal processor 40 may switch the wireless terminal from using the second set of resources (e.g., Mode 2 resources 58) to using the first set of resources (e.g., Mode 1 resources 56) upon determining that the random access procedure is successful.

Whether a return from Mode 2 radio resources to Mode 1 radio resources as act 7-2 is appropriate depends on the particular scenario involved. Several example scenarios are listed below.

Scenario 7A.1: If it is determined as act 702 that the Radom access procedure is successful and the wireless terminal is not in other exceptional cases, the wireless terminal can switch back to Mode 1 autonomously.

Scenario 7A.2: If it is determined as act 702 that the Radom access procedure is successful and the wireless terminal is not in other exceptional cases, after the wireless terminal successfully sets up a radio resource control (RRC) Connection with the eNB, the wireless terminal can switch back to Mode 1 autonomously.

Scenario 7A.3: If it is determined as act 702 that the Radom access procedure is successful and the wireless terminal is not in other exceptional cases, the wireless terminal can switch back to Mode 1 according to the eNB's configuration signaling (broadcast or dedicated).

Scenario 7A.4: If it is determined as act 702 that the Radom access procedure is successful and the wireless terminal is not in other exceptional cases, and after the successfully sets up a RRC Connection with the eNB, the wireless terminal can switch back to Mode 1 according to eNB's configuration signaling (broadcast or dedicated).

If the wireless terminal is originally is configured to use Mode 2 resources, the wireless terminal keeps using Mode 2 resources no matter whether the random access procedure is successful or not. The wireless terminal may switch to Mode 1 radio resources only when: (1) the random access procedure is successful and the wireless terminal is not in other exceptional cases, and the wireless terminal receives the eNB's Mode 1 configuration signaling (broadcast or dedicated); (2) the random access procedure is successful and the wireless terminal successfully sets up RRC Connection with eNB, the wireless terminal is not in other exceptional cases, and the wireless terminal receives the eNB's Mode 1 configuration signaling (broadcast or dedicated).

The latency reduction method and apparatus of the technology disclosed herein allows a wireless terminal to use Mode 2 resources in the early stage of detecting exceptional cases, which may require quite some time for final declaration. Therefore, the wireless terminal does not wait for too long time without using resources, so as to avoid missing many frames, especially for emergency cases for in some public safety applications.

"Out-of-Sync" is reported by a wireless terminal through monitoring downlink reference signal (RS). On the other hand, random access failure occurs when a wireless terminal loses uplink radio links. Downlink and uplink failures do not necessarily occur at the same time, as they are in different frequency spectrum and might experience different uncorrelated fading and different interference. Furthermore, the transmission power of a base station (e.g., eNB) and wireless terminal are different as well, so an area where there is downlink coverage but no uplink coverage may exist.

Figure 8:
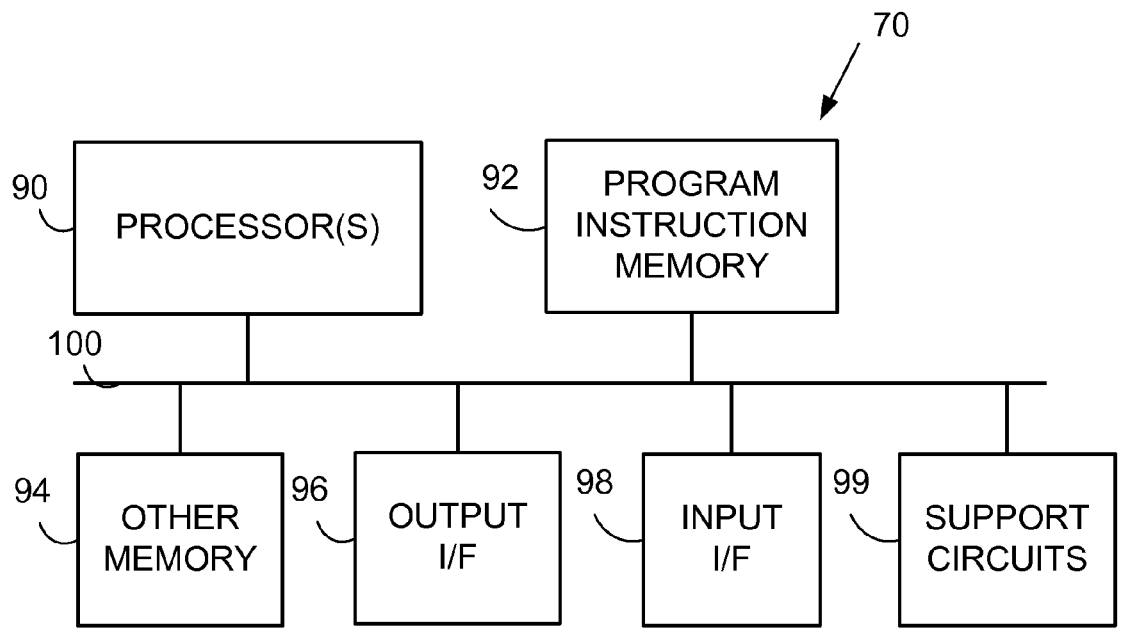
FIG. 8 is a diagrammatic view showing example constituent elements of electronic machinery which may comprise a wireless terminal according to an example embodiment and mode.

Certain units and functionalities of wireless terminal 26 framed by broken line are, in an example embodiment, implemented by terminal electronic machinery 70. FIG. 8 shows an example of such electronic machinery 70 as comprising one or more processors 90, program instruction memory 92; other memory 94 (e.g., RAM, cache, etc.); input/output interfaces 96; peripheral interfaces 98; support circuits 99; and busses 100 for communication between the aforementioned units. The processor(s) 90 may comprise the terminal processor 40, mode selector 52, and random access procedure mode selector 60.

The memory 94, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 99 are coupled to the processors 90 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Mention has been made above of a random access procedure. Table 4 describes selected aspects of a random access procedure.

TABLE 4

Random Access Procedure 5.1.1 Random Access Procedure initialization
The Random Access procedure described in this subclause is initiated by a PDCCH order or by the MAC sublayer itself. Random Access procedure on a SCell may only be initiated by a PDCCH order. If a UE receives a PDCCH transmission consistent with a PDCCH order masked with its C-RNTI, and for a specific Serving Cell, the UE may initiate a Random Access procedure on this Serving Cell. For Random Access on the PCell a PDCCH order or RRC optionally indicate the ra-PreambleIndex and the ra-PRACH-MaskIndex; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for PCell.
Before the procedure can be initiated, the following information for related Serving Cell is assumed to be available:
    the available set of PRACH resources for the transmission of the Random Access
    Preamble, prach-ConfigIndex.
    the groups of Random Access Preambles and the set of available Random Access
    Preambles in each group (PCell only):
    The preambles that are contained in Random Access Preambles group A and Random
    Access Preambles group B are calculated from the parameters numberOfRA-Preambles
    and sizeOfRA-PreamblesGroupA:
    If sizeOfRA-PreamblesGroupA is equal to numberOfRA-Preambles then there is no
    Random Access Preambles group B. The preambles in Random Access Preamble group
    A are the preambles 0 to sizeOfRA-PreamblesGroupA − 1 and, if it exists, the preambles
    in Random Access Preamble group B are the preambles sizeOfRA-PreamblesGroupA to
    numberOfRA-Preambles − 1 from the set of 64 preambles.
    if Random Access Preambles group B exists, the thresholds,
    messagePowerOffsetGroupB and messageSizeGroupA, the configured UE transmitted
    power of the Serving Cell performing the Random Access Procedure, $P_{CMAX, c}$, and the
    offset between the preamble and Msg3, deltaPreambleMsg3, that are required for
    selecting one of the two groups of Random Access Preambles (PCell only).
    the RA response window size ra-ResponseWindowSize.
    the power-ramping factor powerRampingStep.
    the maximum number of preamble transmission preambleTransMax.
    the initial preamble power preambleInitialReceivedTargetPower.
    the preamble format based offset DELTA_PREAMBLE.
    the maximum number of Msg3 HARQ transmissions maxHARQ-Msg3Tx (PCell only).
    the Contention Resolution Timer mac-ContentionResolutionTimer (PCell only).
NOTE:  The above parameters may be updated from upper layers before each Random
          Access procedure is initiated.
The Random Access procedure may be performed as follows:
    Flush the Msg3 buffer;
    set the PREAMBLE_TRANSMISSION_COUNTER to 1;
    set the backoff parameter value in the UE to 0 ms;
    for the RN, suspend any RN subframe configuration;
    proceed to the selection of the Random Access Resource.
NOTE:  There is only one Random Access procedure ongoing at any point in time. If the
          UE receives a request for a new Random Access procedure while another is
          already ongoing, it is up to UE implementation whether to continue with the
          ongoing procedure or start with the new procedure.
5.1.2       Random Access Resource selection
The Random Access Resource selection procedure may be performed as follows:
    If ra-PreambleIndex (Random Access Preamble) and ra-PRACH-MaskIndex (PRACH
    Mask Index) have been explicitly signalled and ra-PreambleIndex is not 000000:
        the Random Access Preamble and the PRACH Mask Index are those explicitly
        signalled.

TABLE 4-continued

Random Access Procedure else the Random Access Preamble may be selected by the UE as follows:
    If Msg3 has not yet been transmitted, the UE may:
    if Random Access Preambles group B exists and if the potential message size (data
    available for transmission plus MAC header and, where required, MAC control
    elements) is greater than messageSizeGroupA and if the pathloss is less than
    $P_{CMAX, c}$ (of the Serving Cell performing the Random Access Procedure) −
    preambleInitialReceivedTargetPower − deltaPreambleMsg3 −
    messagePowerOffsetGroupB, then:
     select the Random Access Preambles group B;
    else:
     select the Random Access Preambles group A.
    else, if Msg3 is being retransmitted, the UE may:
    select the same group of Random Access Preambles as was used for the preamble
    transmission attempt corresponding to the first transmission of Msg3.
    randomly select a Random Access Preamble within the selected group. The random
    function may be such that each of the allowed selections can be chosen with equal
    probability;
    set PRACH Mask Index to 0.
   determine the next available subframe containing PRACH permitted by the restrictions
   given by the prach-ConfigIndex, the PRACH Mask Index and physical layer timing
   requirements [2] (a UE may take into account the possible occurrence of measurement
   gaps when determining the next available PRACH subframe);
   if the transmission mode is TDD and the PRACH Mask Index is equal to zero:
    if ra-PreambleIndex was explicitly signalled and it was not 000000 (i.e., not selected
    by MAC):
     randomly select, with equal probability, one PRACH from the PRACHs available
     in the determined subframe.
    else:
     randomly select, with equal probability, one PRACH from the PRACHs available
     in the determined subframe and the next two consecutive subframes.
   else:
    determine a PRACH within the determined subframe in accordance with the
    requirements of the PRACH Mask Index.
   proceed to the transmission of the Random Access Preamble.
5.1.3  Random Access Preamble transmission
The random-access procedure may be performed as follows:
   set PREAMBLE_RECEIVED_TARGET_POWER to
   preambleInitialReceivedTargetPower + DELTA_PREAMBLE +
   (PREAMBLE_TRANSMISSION_COUNTER − 1) * powerRampingStep;
   instruct the physical layer to transmit a preamble using the selected PRACH,
   corresponding RA-RNTI, preamble index and
   PREAMBLE_RECEIVED_TARGET_POWER.
5.1.4  Random Access Response reception
Once the Random Access Preamble is transmitted and regardless of the possible occurrence of
a measurement gap, the UE may monitor the PDCCH of the PCell for Random Access
Response(s) identified by the RA-RNTI defined below, in the RA Response window which
starts at the subframe that contains the end of the preamble transmission plus three subframes
and has length ra-ResponseWindowSize subframes. The RA-RNTI associated with the PRACH
in which the Random Access Preamble is transmitted, is computed as:
      RA-RNTI = 1 + t_id + 10*f_id
Where t_id is the index of the first subframe of the specified PRACH ($0 \leq t\_id < 10$), and f_id is
the index of the specified PRACH within that subframe, in ascending order of frequency
domain ($0 \leq f\_id < 6$). The UE may stop monitoring for Random Access Response(s) after
successful reception of a Random Access Response containing Random Access Preamble
identifiers that matches the transmitted Random Access Preamble.
   If a downlink assignment for this TTI has been received on the PDCCH for the RA-
   RNTI and the received TB is successfully decoded, the UE may regardless of the
   possible occurrence of a measurement gap:
    if the Random Access Response contains a Backoff Indicator subheader:
    set the backoff parameter value in the UE as indicated by the BI field of the
    Backoff Indicator subheader.
    else, set the backoff parameter value in the UE to 0 ms.
    if the Random Access Response contains a Random Access Preamble identifier
    corresponding to the transmitted Random Access Preamble, the UE may:
    consider this Random Access Response reception successful and apply the
    following actions for the serving cell where the Random Access Preamble was
    transmitted:
     process the received Timing Advance Command;
     indicate the preambleInitialReceivedTargetPower and the amount of power
     ramping applied to the latest preamble transmission to lower layers (i.e.,
     (PREAMBLE_TRANSMISSION_COUNTER − 1) * powerRampingStep);
     process the received UL grant value and indicate it to the lower layers;
    if ra-PreambleIndex was explicitly signalled and it was not 000000 (i.e., not
    selected by MAC):
     consider the Random Access procedure successfully completed.
    else, if the Random Access Preamble was selected by UE MAC:
     set the Temporary C-RNTI to the value received in the Random Access TABLE 4-continued Random Access Procedure Response message no later than at the time of the first transmission corresponding to the UL grant provided in the Random Access Response message;
        if this is the first successfully received Random Access Response within this Random Access procedure:
            if the transmission is not being made for the CCCH logical channel, indicate to the Multiplexing and assembly entity to include a C-RNTI MAC control element in the subsequent uplink transmission;
            obtain the MAC PDU to transmit from the "Multiplexing and assembly" entity and store it in the Msg3 buffer.
NOTE: When an uplink transmission is required, e.g., for contention resolution, the eNB should not provide a grant smaller than 56 bits in the Random Access Response.
NOTE: If within a Random Access procedure, an uplink grant provided in the Random Access Response for the same group of Random Access Preambles has a different size than the first uplink grant allocated during that Random Access procedure, the UE behavior is not defined.
If no Random Access Response is received within the RA Response window, or if none of all received Random Access Responses contains a Random Access Preamble identifier corresponding to the transmitted Random Access Preamble, the Random Access Response reception is considered not successful and the UE may:
    increment PREAMBLE_TRANSMISSION_COUNTER by 1;
    If PREAMBLE_TRANSMISSION_COUNTER = preambleTransMax + 1:
        if the Random Access Preamble is transmitted on the PCell:
        indicate a Random Access problem to upper layers;
        if the Random Access Preamble is transmitted on an SCell:
        consider the Random Access procedure unsuccessfully completed.
    if in this Random Access procedure, the Random Access Preamble was selected by MAC:
        based on the backoff parameter in the UE, select a random backoff time according to a uniform distribution between 0 and the Backoff Parameter Value;
        delay the subsequent Random Access transmission by the backoff time;
    proceed to the selection of a Random Access Resource.
5.1.5        Contention Resolution
Contention Resolution is based on either C-RNTI on PDCCH of the PCell or UE Contention Resolution Identity on DL-SCH.
Once Msg3 is transmitted, the UE may:
    start mac-ContentionResolutionTimer and restart mac-ContentionResolutionTimer at each HARQ retransmission;
    regardless of the possible occurrence of a measurement gap, monitor the PDCCH until mac-ContentionResolutionTimer expires or is stopped;
    if notification of a reception of a PDCCH transmission is received from lower layers, the UE may:
        if the C-RNTI MAC control element was included in Msg3:
        if the Random Access procedure was initiated by the MAC sublayer itself and the PDCCH transmission is addressed to the C-RNTI and contains an UL grant for a new transmission; or
        if the Random Access procedure was initiated by a PDCCH order and the PDCCH transmission is addressed to the C-RNTI:
            consider this Contention Resolution successful;
            stop mac-ContentionResolutionTimer;
            discard the Temporary C-RNTI;
            consider this Random Access procedure successfully completed.
        else if the CCCH SDU was included in Msg3 and the PDCCH transmission is addressed to its Temporary C-RNTI:
        if the MAC PDU is successfully decoded:
            stop mac-ContentionResolutionTimer;
            if the MAC PDU contains a UE Contention Resolution Identity MAC control element; and
            if the UE Contention Resolution Identity included in the MAC control element matches the CCCH SDU transmitted in Msg3:
                consider this Contention Resolution successful and finish the disassembly and demultiplexing of the MAC PDU;
                set the C-RNTI to the value of the Temporary C-RNTI;
                discard the Temporary C-RNTI;
                consider this Random Access procedure successfully completed.
            else
                discard the Temporary C-RNTI;
                consider this Contention Resolution not successful and discard the successfully decoded MAC PDU.
    if mac-ContentionResolutionTimer expires:
        discard the Temporary C-RNTI;
        consider the Contention Resolution not successful.
    if the Contention Resolution is considered not successful the UE may:
        flush the HARQ buffer used for transmission of the MAC PDU in the Msg3 buffer;
        increment PREAMBLE_TRANSMISSION_COUNTER by 1;
        If PREAMBLE_TRANSMISSION_COUNTER = preambleTransMax + 1:
        indicate a Random Access problem to upper layers.
        based on the backoff parameter in the UE, select a random backoff time according to a TABLE 4-continued Random Access Procedure uniform distribution between 0 and the Backoff Parameter Value;
delay the subsequent Random Access transmission by the backoff time;
proceed to the selection of a Random Access Resource.
5.1.6   Completion of the Random Access procedure
At completion of the Random Access procedure, the UE may:
discard explicitly signalled ra-PreambleIndex and ra-PRACH-MaskIndex, if any;
flush the HARQ buffer used for transmission of the MAC PDU in the Msg3 buffer.
In addition, the RN may resume the suspended RN subframe configuration, if any.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method in a wireless terminal which selectively communicates with a node of a radio access network over a radio interface, the method comprising:
providing a first set of radio resources which may be used by the wireless terminal when performing a device-to-device (D2D/SL) communication with another wireless terminal when the wireless terminal is within coverage of a radio access network;
providing a second set of radio resources which may be used by the wireless terminal when performing a device-to-device (D2D/SL) communication with the another wireless terminal when the wireless terminal is not within coverage of the radio access network;
using a processor to determine a resource switch-causing event of a random access procedure;
the processor, upon occurrence of the resource switch-causing event, allowing the wireless terminal, when still within coverage of the radio access network, to use the second set of resources for the device-to-device (D2D/SL) communication in conjunction with the random access procedure.

2. A wireless terminal which selectively communicates over a radio interface with a node of a radio access network, the wireless terminal comprising:
a memory configured to store an identification of a first set of radio resources and an identification of a second set of radio resources;
a processor configured to allocate a radio resource from the first set of radio resources which may be used by the wireless terminal when performing a device-to-device (D2D/SL) communication with another wireless terminal when the wireless terminal is within coverage of a radio access network and to allocate a radio resource from the second set of radio resources which may be used by the wireless terminal when performing a device-to-device (D2D/SL) communication with the another wireless terminal when the wireless terminal is not within coverage of the radio access network;
wherein the processor is configured to determine a resource switch-causing event of a random access procedure;
wherein the processor is configured, upon occurrence of the resource switch- causing event, to allow the wireless terminal, when still within coverage of the radio access network, to use the second set of resources for the device-to-device (D2D/SL) communication in conjunction with the random access procedure.

3. The wireless terminal of claim 2, wherein the processor is configured to allow the wireless terminal, when still within the coverage of the radio access network, to use the second set of resources for the device-to-device (D2D/SL) communication before occurrence of a radio link failure.

4. The wireless terminal of claim 2, wherein the processor is configured to allow the wireless terminal to use the second set of resources upon initiation of the random access procedure.

5. The wireless terminal of claim 2, wherein the processor is configured to allow the wireless terminal to use the second set of resources when a PDCCH order initiates the random access procedure.

6. The wireless terminal of claim 2, wherein the processor is configured to allow the wireless terminal to use the second set of resources when a medium access control (MAC) sublayer of the wireless terminal initiates the random access procedure.

7. The wireless terminal of claim 2, wherein the processor is configured to allow the wireless terminal to use the second set of resources upon receiving a predetermined number of unsuccessful random access response notifications.

8. The wireless terminal of claim 7, wherein the predetermined number of unsuccessful random access response notifications is less than a parameter preambleTransMax specified for the wireless terminal.

9. The wireless terminal of claim 7, wherein the processor is configured to receive the predetermined number from the radio access network.

10. The wireless terminal of claim 9, wherein upon receiving the predetermined number of unsuccessful random access response notifications, the processor is configured to switch the wireless terminal from use of the first set of resources to the second set of resources.

11. The wireless terminal of claim 9, wherein upon receiving the predetermined number of unsuccessful random access response notifications, the processor is configured to:
   indicate a radio link failure (RLF); and
   allow the wireless terminal to use the second set of resources as a result of the RLF failure.

12. The wireless terminal of claim 2, wherein the processor is further configured to switch the wireless terminal from using the second set of resources to using the first set of resources upon further determining that the random access procedure is successful.

* * * * *